(12) United States Patent
Moning et al.

(10) Patent No.: US 12,400,192 B1
(45) Date of Patent: Aug. 26, 2025

(54) AUTONOMOUS TRACKING OF DISPARATE ASSETS

(71) Applicant: U.S. Bank National Association, Cincinnati, OH (US)

(72) Inventors: Todd C. Moning, Victoria, MN (US); James Andrew Cantrell, Duluth, GA (US); Valerie Felice Lancelle, Caledonia, WI (US); Christopher S. Swanson, Blaine, MN (US); Dominic V. Venturo, Inver Grove Heights, MN (US)

(73) Assignee: U.S. Bank National Association, Minneapolis, MN (US)

( * ) Notice: Subject to any disclaimer, the term of this patent is extended or adjusted under 35 U.S.C. 154(b) by 68 days.

(21) Appl. No.: 17/690,838

(22) Filed: Mar. 9, 2022

Related U.S. Application Data

(60) Provisional application No. 63/291,212, filed on Dec. 17, 2021.

(51) Int. Cl.
  *G06Q 10/20* (2023.01)
  *G06F 11/07* (2006.01)
  *H04L 41/16* (2022.01)
(52) U.S. Cl.
  CPC ............ *G06Q 10/20* (2013.01); *G06F 11/07* (2013.01); *H04L 41/16* (2013.01)
(58) Field of Classification Search
  None
  See application file for complete search history.

(56) References Cited

U.S. PATENT DOCUMENTS

| 6,581,045 | B1* | 6/2003 | Watson | G06Q 30/0283 |
| | | | | 705/400 |
| 7,672,921 | B1* | 3/2010 | Clay | G06Q 10/06 |
| | | | | 706/45 |

(Continued)

FOREIGN PATENT DOCUMENTS

AU   2005100867 A4   12/2005

OTHER PUBLICATIONS

Z. A. Bukhsh and I. Stipanovic, "Predictive Maintenance for Infrastructure Asset Management," in IT Professional, vol. 22, No. 5, pp. 40-45, Sep. 1-Oct. 2020. (Year: 2020).*

(Continued)

*Primary Examiner* — Mohammad Z Shaikh
(74) *Attorney, Agent, or Firm* — Alston & Bird LLP

(57) ABSTRACT

One exemplary aspect concerns a system that includes a communications circuit, logic circuitry and an interface circuit working together to aggregate and provide feedback on indications of ongoing use of various assets such as in use in and around a residence. For each asset, the communications circuit and logic circuitry are used to receive and aggregate ongoing-use indications, access a profile indicating an asset-related lifecycle, and in response execute an algorithm to adjust a valuation score of the asset. The interface circuit may report on the ongoing use of said at least one of the plurality of disparate assets. In a more specific example, the valuation score is associated with one or more environmental-related components that appreciate and/or depreciate with ongoing use of the asset over portions of the lifecycle, and the assets may be residence-related such as including solar panels, IoTs, battery-assisted vehicles, and HVAC appliances.

14 Claims, 6 Drawing Sheets

(56) References Cited

U.S. PATENT DOCUMENTS

| | | | |
|---|---|---|---|
| 8,073,714 B1 | 12/2011 | Ball | |
| 8,396,769 B1 | 3/2013 | Selig et al. | |
| 10,229,394 B1* | 3/2019 | Davis | H04L 41/5074 |
| 10,299,394 B2* | 5/2019 | Zhong | F04D 25/068 |
| 10,599,982 B2* | 3/2020 | Pal | G06N 20/00 |
| 11,288,577 B2* | 3/2022 | Zheng | G06N 3/084 |
| 11,537,919 B2* | 12/2022 | Stump | G05B 19/409 |
| 11,544,676 B2* | 1/2023 | Ghosh | G06N 3/08 |
| 11,624,731 B2* | 4/2023 | Huang | G01N 29/449 |
| | | | 702/34 |
| 11,704,942 B2* | 7/2023 | Zhang | G07C 5/006 |
| | | | 701/29.4 |
| 11,755,940 B2* | 9/2023 | Jin | H10N 69/00 |
| | | | 257/31 |
| 2001/0044747 A1 | 11/2001 | Ramachandran et al. | |
| 2002/0077941 A1 | 6/2002 | Halligan et al. | |
| 2002/0128728 A1* | 9/2002 | Murakami | G06F 11/2294 |
| | | | 714/E11.173 |
| 2003/0074296 A1* | 4/2003 | Blanchard | G06Q 20/102 |
| | | | 705/36 R |
| 2004/0049715 A1* | 3/2004 | Jaw | H04L 41/0681 |
| | | | 714/43 |
| 2004/0236587 A1* | 11/2004 | Nalawade | G06Q 30/0645 |
| | | | 705/307 |
| 2005/0071376 A1 | 3/2005 | Modi | |
| 2005/0081410 A1* | 4/2005 | Furem | E02F 9/267 |
| | | | 709/200 |
| 2007/0203857 A1* | 8/2007 | Hagen | G06Q 10/0875 |
| | | | 700/106 |
| 2008/0255862 A1* | 10/2008 | Bailey | G06Q 40/06 |
| | | | 707/999.107 |
| 2008/0270202 A1* | 10/2008 | Krempel | G06Q 10/06 |
| | | | 705/30 |
| 2009/0182594 A1* | 7/2009 | Choubey | G06Q 10/06 |
| | | | 705/7.33 |
| 2010/0004857 A1 | 1/2010 | Pereira et al. | |
| 2010/0057769 A1* | 3/2010 | Lippert | G06Q 10/00 |
| | | | 709/206 |
| 2011/0161155 A1 | 6/2011 | Wilhelm et al. | |
| 2012/0047082 A1 | 2/2012 | Bodrozic | |
| 2012/0143564 A1* | 6/2012 | Li | G05B 23/0283 |
| | | | 703/2 |
| 2012/0197872 A1* | 8/2012 | Wiese | G06Q 10/06 |
| | | | 707/E17.014 |
| 2012/0221371 A1* | 8/2012 | Hegazy | G06Q 50/16 |
| | | | 705/7.25 |
| 2012/0254345 A1* | 10/2012 | Montoya | G06F 11/2294 |
| | | | 709/217 |
| 2012/0310597 A1* | 12/2012 | Uchiyama | G05B 23/0278 |
| | | | 702/185 |
| 2013/0174587 A1* | 7/2013 | Lee | F25C 1/04 |
| | | | 62/73 |
| 2013/0198027 A1* | 8/2013 | Anthonyson | G06Q 10/20 |
| | | | 705/28 |
| 2013/0198217 A1 | 8/2013 | Narula et al. | |
| 2014/0101058 A1* | 4/2014 | Castel | G06Q 10/109 |
| | | | 705/305 |
| 2014/0330747 A1* | 11/2014 | Candas | G06Q 40/06 |
| | | | 705/36 R |
| 2014/0350992 A1* | 11/2014 | Horton | G06Q 10/06315 |
| | | | 705/7.25 |
| 2014/0372289 A1* | 12/2014 | Doom | G06Q 10/20 |
| | | | 705/305 |
| 2015/0186826 A1* | 7/2015 | Sigrist | G06Q 10/063 |
| | | | 705/7.25 |
| 2016/0097698 A1* | 4/2016 | Leao | G05B 23/0283 |
| | | | 702/183 |
| 2016/0125518 A1* | 5/2016 | Doom | G06Q 30/012 |
| | | | 705/39 |
| 2016/0246813 A1* | 8/2016 | Nasef | G06F 16/176 |
| 2016/0330132 A1* | 11/2016 | Rickey | G06Q 10/06 |
| 2017/0063417 A1* | 3/2017 | Butner | H04M 1/21 |
| 2017/0206510 A1* | 7/2017 | Horton | G06Q 10/063118 |
| 2018/0204281 A1 | 7/2018 | Painter et al. | |
| 2019/0025810 A1* | 1/2019 | Chapin | F01D 21/003 |
| 2019/0057307 A1* | 2/2019 | Zheng | G06N 3/044 |
| 2019/0086911 A1* | 3/2019 | Xin | G05B 13/0275 |
| 2019/0114696 A1 | 4/2019 | Steelberg et al. | |
| 2019/0349254 A1 | 11/2019 | Nolan et al. | |
| 2020/0118142 A1* | 4/2020 | Mukunya | G06Q 30/012 |
| 2020/0240875 A1* | 7/2020 | Venkateswaran | G01M 99/005 |
| 2020/0311300 A1* | 10/2020 | Callcut | G06F 30/20 |
| 2020/0380388 A1* | 12/2020 | Wang | G06N 3/044 |
| 2020/0387968 A1 | 12/2020 | Cella | |
| 2020/0391884 A1* | 12/2020 | Hawley | G07C 5/0816 |
| 2020/0406976 A1* | 12/2020 | Shioya | B62D 21/09 |
| 2021/0272051 A1 | 9/2021 | Ali et al. | |
| 2021/0312406 A1* | 10/2021 | Dedes | G06N 3/006 |
| 2021/0312511 A1* | 10/2021 | Chaudhary | G06N 20/00 |
| 2021/0398187 A1* | 12/2021 | Tennur Narayanan | G06Q 30/012 |
| 2022/0100187 A1* | 3/2022 | Isik | G06N 3/08 |
| 2022/0284278 A1* | 9/2022 | Tang | G06N 3/08 |
| 2022/0351554 A1* | 11/2022 | Keluskar | F16C 43/04 |
| 2023/0123527 A1* | 4/2023 | Michael | G05B 23/0221 |
| | | | 702/183 |

OTHER PUBLICATIONS

T. Bansal, S. S. Agrawal, D. Kumar, M. T. Shambu and P. Inbarajan, "AI based Diagnostic Service for IOT enabled Smart Refrigerators," 2021 8th International Conference on Future Internet of Things and Cloud (FiCloud), Rome, Italy, 2021, pp. 163-168, (Year: 2021).*

L. Lino Ferreira et al., "Predictive Maintenance of home appliances: Focus on Washing Machines," IECON 2021—47th Annual Conference of the IEEE Industrial Electronics Society, Toronto, ON, Canada, 2021, pp. 1-6. (Year: 2021).*

Centriq, "My Centriq: How it Works", 8 pages, (2022). [Retrieved from the Internet at URL: <https://web.archive.org/web/20220124143527/https://www.mycentriq.com/how-it-works/>].

Homdna, "Homdna", 5 pages, (2019). [Retrieved from the Internet at URL: <https://web.archive.org/web/20190828110549/https://homdna.com/>].

Homezada, "All-in-One Suite of Apps to Manage Your Home", 9 pages, (2022). [Retrieved from the Internet at URL: <https://web.archive.org/web/20220131135708/https://www.homezada.com>].

Kukun, "Kukun helps homeowners buy and renovate to maximize home equity", retrieved from the Internet at URL: <https://web.archive.org/web/20211129085634/https://mykukun.com/>] on Mar. 26, 2024, 4 pages.

* cited by examiner

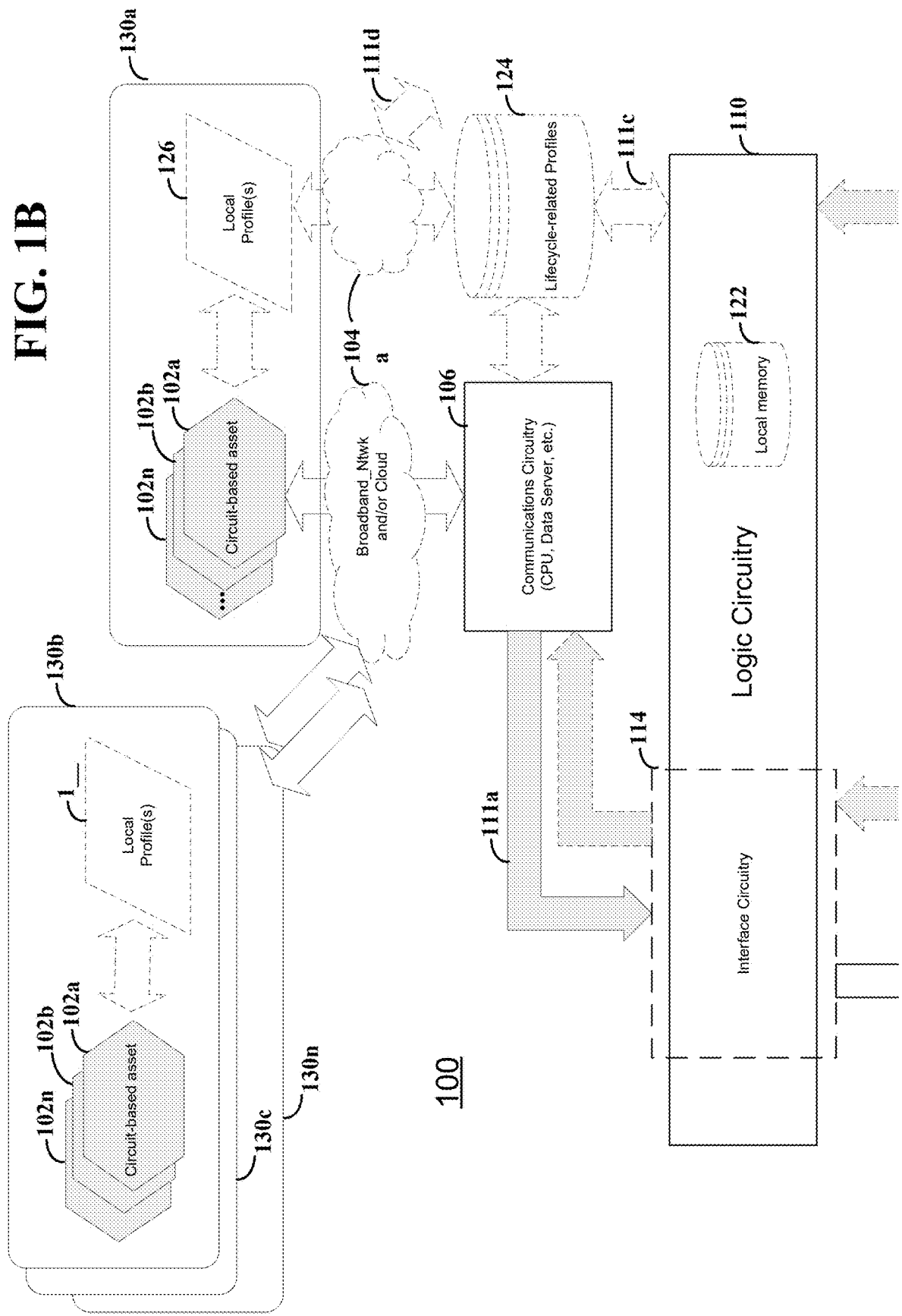

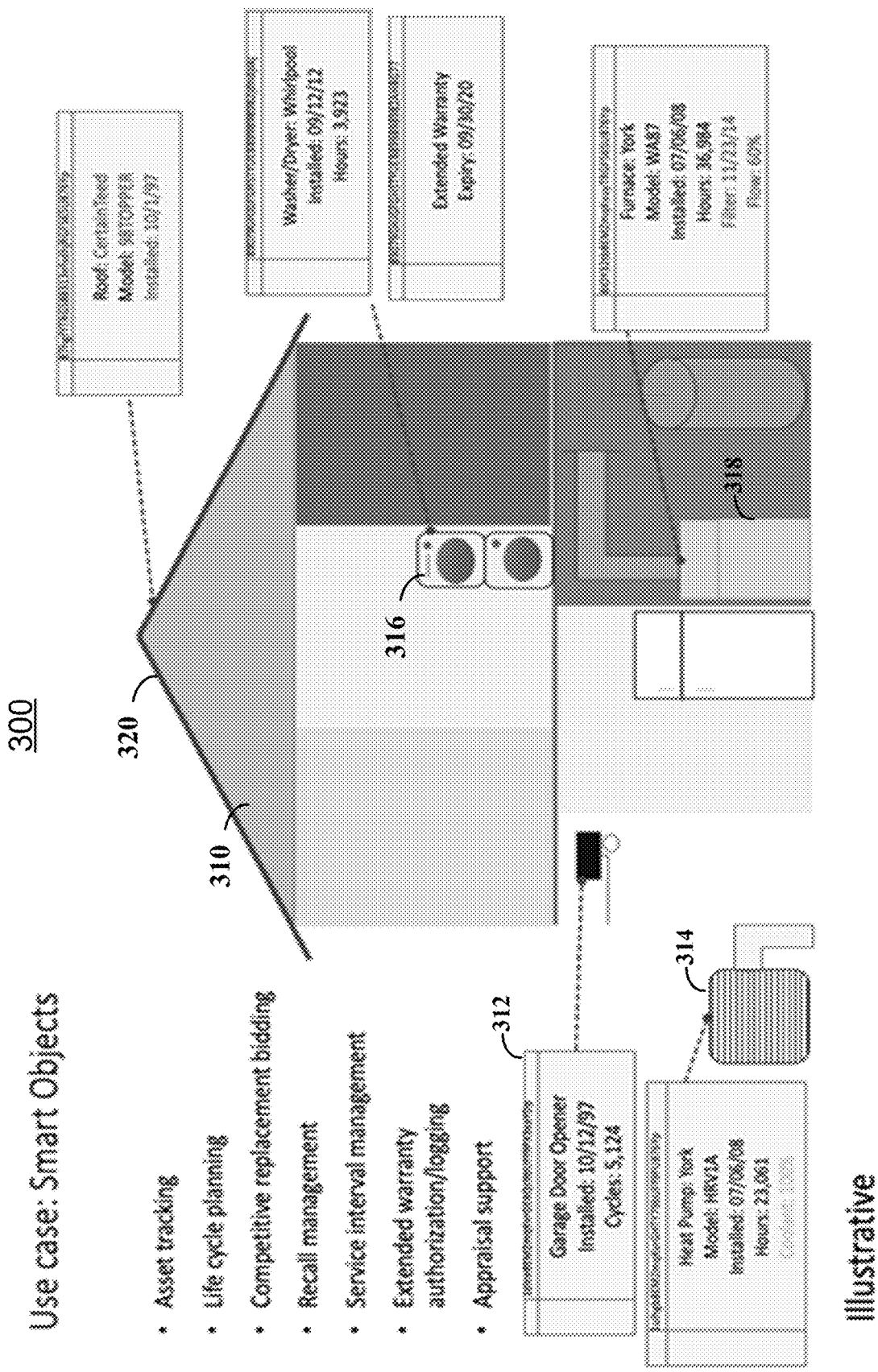

AUTONOMOUS TRACKING OF DISPARATE ASSETS

OVERVIEW

The ongoing advancement of various technologies has vastly increased the numbers of new products (e.g., household items, automobiles, etc.) designed to improve the convenience of everyday living. As many of these products are designed to address a wide range of concerns, it is important to understand their effectiveness, their value and when they should be replaced. For example, many new technologies have been promoted by government departments and numerous industries to promote personal health and/or environmental concerns to decrease a person's carbon footprint. In connection with products that may affect one's health and/or environmental, a plethora of studies, marketing efforts, and government-supports programs have promoted the replacement of older and environment-unhealthy technologies as a matter of extreme importance. While many have favorably responded to such promotions, many individuals and communities have been slow in embracing such promotions. Adverse responses, whether or not meritorious, may be attributable to many factors. Among others, these include: high costs of replacement, confusion and distrust as to the actual-versus-advertised benefits of replacing assets currently in use, efforts to minimize actual use for extending the life of existing assets, and environmental impact associated with manufacture new assets and discarding of existing assets, costs and information associated with maintenance of unfamiliar new assets, the current and projected economic values of such replaceable assets, and consumption of rare-earth resources and impact of supply-chain issues.

Moreover, on larger scales in which populations relating to eco-related technologies, promoting the replacement of seemingly-outdated household assets (cars, lawnmowers, lights, furnaces, etc.) in a timely manner has been reported as having possible significant impacts on the environment, governmental-spending budgets and public education. For example, in numerous reports concerning the impact of educating average individuals on the issue of carbon footprint, it is suggested that proper education on use of many conventional assets, would impact eco-friendly decisions to reduce individual carbon emissions by over 2.5 tons of $CO_2$ per year.

These factors also come into play for a variety of contexts whether or not they directly relate to health and environment and having sufficient facts and accurate information concerning one's assets and their use has significant importance. For instance, in connection with insurance claims on personal property losses, due inaccurate property-record keeping and related issues, the FBI estimates that the total cost of insurance fraud (excluding health insurance) is more than $40 billion per year. When taking into account the inaccuracy of reported estimates on the purchase dates and depreciation-aspects of many such assets, the societal costs of in the area of insurance claims alone are believed to be much higher. While there are a number of approaches being used to mitigate such fraud and inaccurate reporting, as evidenced by such statistics, many current approaches are rudimentary and susceptible to fraud and other factors leading to inaccurate basis for processing insurance claims.

For purpose in promoting health and safety of owners and other personnel involving electrical products, many companies and government regulatory agencies have published requirements and standards on the importance of maintaining and replacing aging electrical products before they may become susceptible to safety-related malfunctions. For example, electrical-product safety reports indicate that many if not most electrical accidents can be mitigated or prevented with a better understanding of which products are poorly-manufactured, their proper installation and having such products regularly inspected and maintained.

Whether the aim is to optimize a person's health, carbon footprint, or to improve the quality, affordability and convenience of everyday living, having a firm understanding on the extent and impact of one's assets has important implications in many contexts.

SUMMARY

Various example embodiments and aspects of the present disclosure are directed to issues such as those addressed above and/or others which may become apparent from the following disclosure concerning management of one's assets, particularly products, appliances and systems, for example, which may be used in and around a facility (whether personal residences, office venues, industrial settings, public places, etc.). As examples, such management may be directed to monitoring and promoting the replacement of products with products that are more energy efficient and/or that are more eco-friendly through which contribution of emissions and/or one's carbon footprint is mitigated by such monitoring and/or replacement of the asset.

In certain example embodiments, exemplary aspects of the present disclosure are directed to apparatuses and methods involving tracking and reporting circuitry configured to monitor certain data feeds associated with circuit-based assets such as products, appliances and systems as may be used in a facility or personal residence. More specific aspects are directed to circuitries that access profiles associated with such assets and their oftentimes variable lifecycles and the selection of one or more appropriate algorithms through which lifecycle-related valuation scores may be generated as such assets are being used. Based on such lifecycle-related valuation scores, interface circuitry may be used to provide feedback concerning on-going use of the assets. In more specific exemplary aspects, this feedback is based on particular data input streams appropriate for generating accurate reports on ideal times to replace one or more of the assets, eco-related (e.g., eco-friendly or eco-unfriendly) valuation scoring of the asset or collection of assets, and/or projections on how such valuation scoring may change over segments of the associated asset lifecycle (s).

In a more specific example embodiment, aspects of the present disclosure are directed to a system that includes a communications circuit, logic circuitry and an interface circuit working together to aggregate and provide data regarding ongoing use of various assets such as in use in and around a residence. As examples, such data (or "information") may be in any of one or more of forms including digital and/or analog data, sensor-based monitoring (e.g., temperature-sensitive circuitries, cameras, microphones, chemical sensors, etc. For each asset, the communications circuit and logic circuitry are used to receive and aggregate ongoing-use indications, access a profile indicating an asset-related lifecycle, and in response execute an algorithm to adjust a valuation score of the asset. The interface circuit may report on the ongoing use of said at least one of the plurality of disparate assets. In a more specific example, the valuation score is associated with one or more environmental-related components that appreciate and/or depreciate with ongoing use of the asset over portions of the lifecycle, and the assets may be used in a residence (e.g., solar panels, IoTs (Internet of Things), battery-assisted vehicles, and HVAC appliances).

In other specific examples, the above-noted output from the interface circuitry is used as input data to drive asset-servicing and insurance and/or financial-related service engines.

Further specific aspects of the present disclosure may build on the above-characterized aspects. Such aspects include, for example, the selected algorithm being used to calculate data for predicting the potential adverse impacts and/or benefits if one or more of the assets were to be replaced at certain times relative to the lifecycle(s) of the asset(s). In connection with such reports on the potential adverse impacts and/or benefits, the algorithms and associated interface circuitry may be configured to provide particular recommendations associated with the assets' further ongoing use and/or replacement, and how such further use and/or replacement may affect the lifecycles of the assets and/or related environmental factors.

Certain other specific aspects of the present disclosure, which may also build on the above-characterized aspects, are directed to cooperative operation of communications circuits for receiving data regarding ongoing use of a plurality of disparate assets, logic circuitry to carry out, for each of the plurality of disparate assets, a set of actions related to tracking use of the asset(s), and interface circuit to generate a report, in response to the set of actions being carried out for at least one of the plurality of disparate assets, concerning the ongoing use of said at least one of the plurality of disparate assets. In a more specific example embodiment, the set of actions include aggregating the ongoing-use indications received from the communications circuits, accessing at least one profile indicating a lifecycle associated with the asset, and selecting for execution, an algorithm from among a plurality of algorithms, in response to the at least one profile and the aggregations, to adjust a valuation score of the asset. In certain more-specific examples such as related to the above-characterized predictions of the potential adverse impacts and/or benefits, the selected algorithm refer to or include an AI/ML (artificial-intelligence/machine-learning) algorithm to be executed by the logic circuitry based on behavioral-feedback inputs including the received ongoing-use indications and optionally also based on external data that is specific to a class of assets covering certain of the assets associated with the ongoing-use indications.

In yet further specific examples, aspects of the present disclosure are directed to processes and apparatus for authenticating access to databases and server systems, and to maintaining privacy rights of asset owners, which are used in connection with the above types of apparatuses.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 1A and 1B are block diagrams illustrating respective aspects of one form of a system for tracking and providing feedback on disparate assets, in accordance with the present disclosure;

FIG. 3 is a high-level block diagram of a particular example system such as disclosed in connection with one of more of the previously-presented figures and wherein the assets at issue are associated with a residence or facility, in accordance with the present disclosure.

Figure 1A:
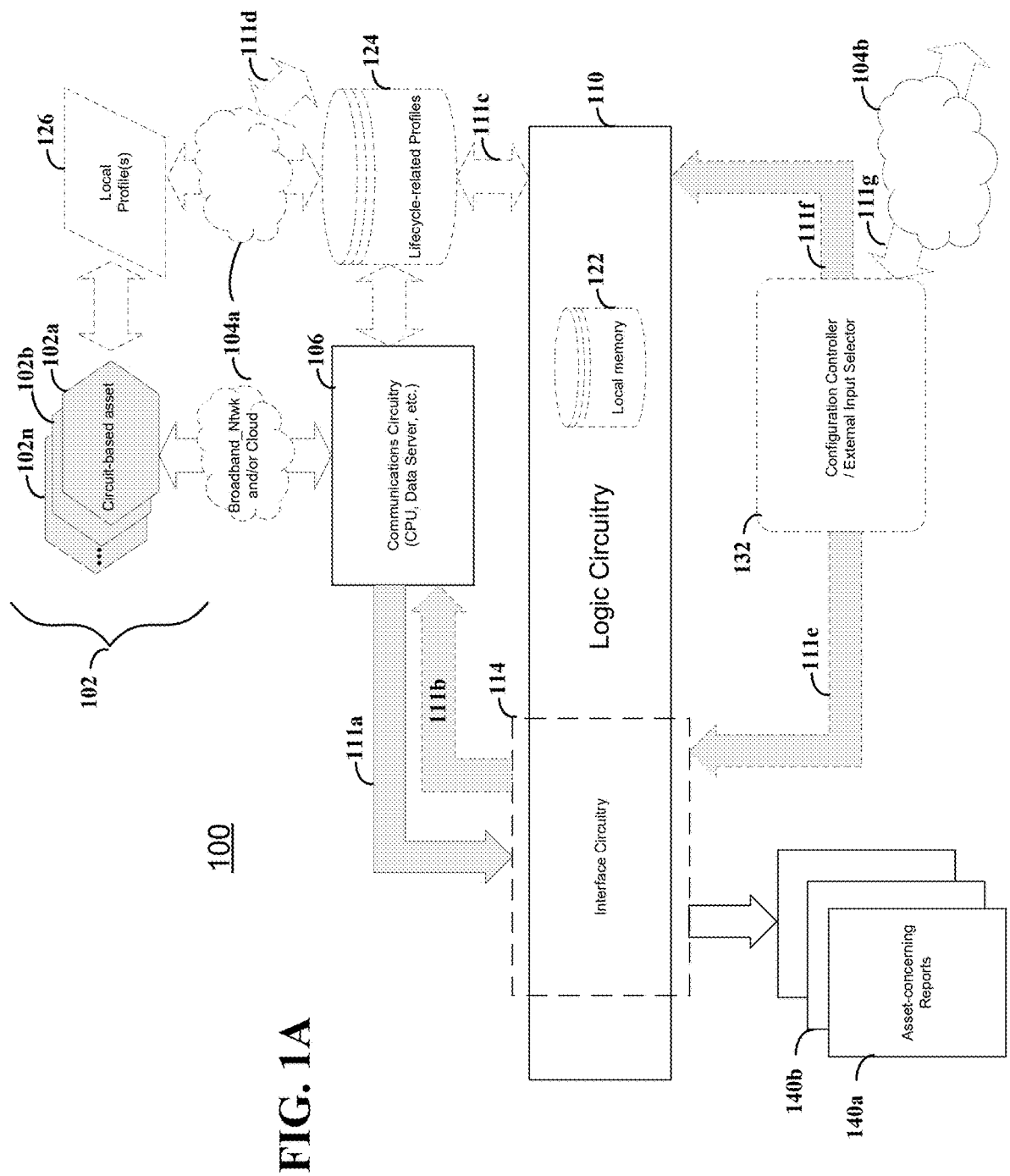

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of methods and apparatuses (e.g., systems, circuits and related devices) for autonomously tracking and reporting on certain data feeds related to certain circuit-based assets in and around a person's residence. Such assets may include, for example, a residence owner's appliances, HVAC systems, IoTs, electric vehicles and the like. Certain more-specific examples concern receiving and processing ongoing asset usage reports, and in some instances external resources, to provide reports which may be used in connection with algorithms and related circuitry to provide valuation scoring and recommendation on continued use of or replacement of existing assets with newer/eco-friendly technologies. While not necessarily so limited to circuit-based assets in and around a person's residence, various aspects may be appreciated through the following discussion of non-limiting examples in these and related contexts.

Using an eco-friendly context as one such example, such valuation scoring may be based on the afore-mentioned tracking and reporting on a homeowner's assets including a currently-owned SUV, the utility (HVAC-related) costs of owning the home, and a power generator used as a backup for the home. The valuation scoring may be associated with current and further ongoing use of such assets in view of prospective procurement of newer HVAC equipment, electric-assist vehicles and roof-installed solar panels. Such scoring may be used to indicate the past and forward-looking values/costs of such assets initially and at different stages of their lifecycles. In some instances, the valuation scoring may be weighted or biased in view of a social-sentiment parameter (e.g., related to one's interest in new/eco-friendly technologies as indicated in a profile associated with the assets), and feedback accompanying the scoring may include recommendations on how best to fund forward-looking financial costs, the degrees to which procurement/maintenance of the assets may provide certain financial/sentiment/other benefits (e.g., lifecycle-specific emission comparisons for assets replaced by procured eco-friendly technologies). In other instances, the valuation scoring may be influenced by exogenous variables such as exogenous inputs that relevant to usage of the asset(s) and that are external to the usage patterns of the asset (e.g., "average external temperature" or "weather event related wear/tear" of an asset used outside). In certain examples, an endogenous variable may be "time in service at peak output" or "volume of water conveyed through the asset per day". Assuming application of such methodology to large numbers of assets and relatively complex variables that affect the assets' lifecycles, the sophistication of the scoring and/or recommendations may also involve selection and execution of an AI/ML algorithm to provide the appropriate levels of feedback.

Accordingly, in the following description various specific details are set forth to describe further specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

More specific aspects are directed to certain methodology and a related system involving or including communication and processing circuitries configured to access database-stored profiles associated with such assets and their oftentimes variable lifecycles and directed to selection of one or more appropriate algorithms through which lifecycle-related valuation scores may be generated as feedback in view of actual (e.g., real-time) usage reports indicating the extent to which such assets are being used. Based on such lifecycle-related valuation scores, the system may include interface circuitry to provide feedback concerning on-going use of the assets. In certain examples, the communication circuitry may be implemented using a data-communications server communicating with homeowners and/or subscribers of such services over one or more broadband networks (e.g., the Internet, cellular telephone networks).

In more specific exemplary aspects, the feedback may be based on particular data input streams appropriate for generating accurate reports on ideal times to replace one or more of the assets, eco-related valuation scoring of the asset or collection of assets, and/or projections on how such valuation scoring may change in view of certain recommended actions. For example, the feedback may include projections based on such valuation scoring over segments of the assets' lifecycles, depending on the asset, initial financial depreciation or appreciation with reports on actual ongoing use of the assets in the beginning, middle and end of the assets' lifecycle, and/or based on projections of further reports of such usage involving replacement assets having newer/eco-friendly technologies.

In another specific example, the present disclosure is directed to a system that includes a communications circuit, logic circuitry and an interface circuit working together to aggregate and provide feedback data concerning ongoing use of various assets such as in use in and around a residence. For each such asset, the communications circuit and logic circuitry are used to receive and aggregate ongoing-use indications, access a profile indicating an asset-related lifecycle, and in response execute an algorithm to adjust a valuation score of the asset. The interface circuit may report on the ongoing use of said at least one of the plurality of disparate assets. In a more specific example, the valuation score is associated with one or more eco-related components that appreciate and/or depreciate with ongoing use of the asset over portions of the lifecycle, and the assets may be used in connection with a venue surrounding the residence, an owner of the residence, and/or another account holder subscribing to the service provider on behalf of which the system is operated. Non-limiting examples of the types of assets may include one or more of: solar panels; wind-based power generators; devices referred to as or including IoTs (Internet of Things), vehicles such as battery-assisted automobiles, e-bicycles, electric scooters, etc.); entertainment systems; and personal computers and office equipment; in some instances, various types of furniture and artwork in the home; utility-type appliances (e.g., gas/electric heaters and other HVAC units); and the residence itself with and without one or more of these previously-listed types of assets included.

In other specific examples, aspects of the present disclosure may build on the above-characterized system and these aspects include, for example, the processing circuitry selecting a particular algorithm, among a plurality of available algorithms associated with different types of asset-specific lifecycles, based on its attributes of being able to calculate certain data for reporting on and/or predicting the potential adverse impacts and/or benefits if one or more of the assets were to be replaced at certain times relative to the lifecycle (s) of the asset(s). Such an algorithm may be configured to generate appropriate valuation scoring for the asset(s) so that an interface circuit, as another part of the system, may generate and output data (or feedback) including a report with related valuation scores and in some cases particular recommendations and related information associated with the assets' further ongoing use and/or replacement. For example, such related information may include how further use and/or replacement may affect the lifecycles of the assets and/or eco-related factors. In certain examples, the interface circuit may include a CPU configured to generate such data, based on asset-specific information indicated in one or more profiles stored in a system database (e.g., via a CPU-accessible memory circuit). The interface circuit may then transmit the data via a broadband network or other data channel to an authorized user or recipient, and such data may then be displayed, for example, in written reports or via a graphic user interface and CPU monitor. Depending on the configuration, the authorized user or recipient may be the owner of the assets, someone or some entity (e.g., a proxy CPU) acting on behalf of the owner, and/or an authorized third party which may evaluate the data for promoting offering in the form of products and services which may be used or procured by the owner.

Populating such databases/registries may be achieved in various ways to convey sufficient information for one or more of the appropriate algorithms to be selected. For example, for assets which might quickly depreciate with use (e.g., a new luxury sports car), sufficient information may simply be the purchase/sticker price of the car, year, make and model. In addition and/or in the alternative, sufficient information may range from any one or more of type of asset (e.g., automobile, electric water heater, HVAC appliance, IoT, large kitchen appliance) and somewhat specific identification information (e.g., model, year of manufacture, serial number) as may be obtained by bar code scanning of each such asset, entering (typing, dictating, imaging, etc.) information into a database/registry to convey for asset type, model, year of manufacture, and the asset (e.g., in the case of an asset such as a WiFi router using WiFi or Bluetooth) being activated to transmit identification information to a communications device in a facility, wherein the communications device is configured to develop/format the asset information for the database(s).

Such profiles may be maintained and/or initially populated into databases/registries by or from someone on behalf of the asset owner, third parties (e.g., syndicated data source provider and/or manufacturers of the assets) which have collected information regarding locations of assets. For example, certain types of assets (e.g., a washing machine and a dryer manufactured by the same or different manufacturers) may be registered with the manufacture at the time of sale. Also, such assets may include WiFi-enabled and/or other circuits enabled for external communications which circuits may be retrofitted or originally integrated for communications with other facility-proximal devices (smartphones, manufacturers' websites, security systems and/or add-on security sensors, etc.).

Such facility-proximal devices may autonomously monitor usage of the asset directly or indirectly. In some instances, such monitoring may occur directly when used in conjunction with certain types of asset which are configured to work with a user-operable communication device such as a Sonos® entertainment device or system having connectivity with a smartphone. In such an example, the entertainment system or smartphone may act as the device monitoring use incidents (e.g., usage times) of the entertainment system. Mobile facility-proximal devices may also be used in an indirect context to autonomously collect and forward usage groups of indications/alerts from the above assets, for example, in the case of a users' smartphone which would be expected to be in sufficient proximity of the monitored asset whenever the asset may be in use and in response to such uses, the smartphone would be capable of communicating (e.g., via Bluetooth, WiFi, cellular network) from the residence to the system's communications and logic circuitries. In more specific examples, the usage and identity data of each asset may be retrieved from the assets themselves, from a data-collection circuit (e.g., server operating at a facility in or around which assets are located, and/or through a network of OEMs that receive the data from or on behalf of the assets). In this latter instance or example, the usage data may be fetched from a qualifying OEM or sensor manufacturer's API instead of directly from the device (or asset).

Yet other specific aspects of the present disclosure are directed to individual subparts of the above-characterized type of system and wherein such subparts are configured to work with the system and/or its other subparts. Depending on the embodiment, such subparts are directed to one or a combination of: the communications circuitry, the logic circuitry, the interface circuit, the memory circuitry storing the asset-related profiles, and further communication/computing-based circuits and devices. The communications circuitry may be implemented in various forms, one of which is or includes a data-communications transceiver (receiver/transmitter) integrated with a CPU-based server that is network enabled and configured to receive data regarding ongoing use of the asset and in many instances, also to provide one or more data-communication services to the owner of the asset.

The communications circuitry may include both a CPU-based server and also communication/computing-based circuits and devices that may be user-operable computing devices and/or devices installed at the facility, in or around which the assets use incidents are being monitored. In this context, examples of such communication/computing-based circuits and devices may include, as examples, smartphones, other PDAs, and stand-alone CPUs systems such as laptops, personal computers, mainframes, etc. Each of these devices may be configured to aid in: the reception and/or feeding of data to the system for purposes of enabling collection of asset usage data; the selection and/or provision of the algorithms to be executed by the logic circuitry; the populating of data for the asset related profiles; and the provision of report formatting, GUIs, APIs (application program interfaces), etc. to enable external computing devices to exchange data and related functionality easily and securely.

The data regarding ongoing use may be data communications sent from communication circuitry integrated with or secured to the asset(s) and/or by using another monitoring sensing device enabled to aggregate/send data regarding asset-related use in a form different than conventional data sent over a data communication channel. As an example, the data communications circuitry may include one or more monitoring devices stationed at the facility so as to monitor use of the asset(s) and, optionally, may be integrated with the logic circuitry to aggregate the received ongoing-use indications. Monitoring devices in this context may include circuitry with a transmitter to capture and provide alerts to another communication circuit and/or part of the logic circuitry for aggregating the received usage indications, and further include a sensor (e.g., sensing light, sensing one or more frequencies such as sound, and/or sensing one or more of motion, energy activation such as conduction of current, and change in temperature), with the type of sensing being particular to the asset and triggering the transmitter to send the alerts (e.g., one alert at a time or as a coded signal to represent a group of use incidents).

In response to receiving asset-use indications and/or feed data regarding the assets, any asset identification information accompanying the indications or data may be transferred to an internal system database for more immediate access to the logic circuitry.

As another important subpart of the present disclosure is the logic circuitry (standing alone or in combination one or more of the other above subparts), which may be configured to carry out, for each of a plurality of disparate assets, a set of actions related to tracking and accumulating usage data pertaining to ongoing use of the assets. In a more specific example embodiment, the set of actions include aggregating the ongoing-use indications received from the communications circuits, accessing at least one profile indicating a lifecycle associated with the asset, and selecting for execution, an algorithm from among a plurality of algorithms. The selection may be in response to the at least one profile and the aggregations, to adjust a valuation score of the asset or assets.

In certain more-specific examples such as related to the above-characterized predictions of the potential adverse impacts and/or benefits (e.g., emissions due to continued usage rates, financial outcome (savings, credit provision, maintenance contracting, etc.) if certain action is or is not taken towards replacement of the asset(s)), the selected algorithm refers to or includes an algorithm (e.g., having or referring to AI/ML (artificial-intelligence/machine-learning) attributes) to be executed by the logic circuitry based on behavioral-feedback inputs including the received ongoing-use indications and optionally also based on data that is specific to a class of assets covering certain of the assets associated with the ongoing-use indications. The behavioral-feedback inputs and/or underlying data may be from various sources, whether developed internally by the system's logic circuitry or provided to the system from a third party (syndicated data source provider and manufacturers' reports), and such inputs and data may be based on the system's previous usage monitoring of other similarly-situated assets associated with or specific to the same class of assets. One or more of these algorithms may be designed to take into account one or more variable parameters including one or a combination of more than one of the following, each concerning said at least one of the plurality of disparate assets: recall notices, availability of needed resources to replace or maintain the asset such as supply-chain availability for asset maintenance, costs associated with parts and labor replacement, and social sentiment. Useful data in each of these categories may be collected directly by the communications circuitry of the above-characterized system and/or indirectly for the system from third-party data feeds. In either case, such third-party data feeds may be provided, for example, via the Internet to access reports directly from manufacturers of the assets, websites of government entities reporting in connection with manufacturers of the assets, and data-collection channels provided by various syndicated data sources such as sold by IRI, Nielson, and Aglo. By programming the system to regularly access such websites and data sources, variable parameters used by selected algorithms of the system may provide up-to-date information for these various types of exemplary valuation scoring.

Turning now to the figures which are also in accordance with the present disclosure, FIG. 1A and FIG. 1B exemplify some of the many illustrated embodiments corresponding to a system 100 including most, if not all, of the above-discussed subparts. FIG. 1A illustrates each such subpart with the plurality of disparate assets 102 shown in one example and applicable to their arrangement in connection with a residence, an office area, building, or an industrial area, whereas FIG. 1B shows the system 100 with such assets in groupings or facility-related sets 130a, 130b, 130c, . . . , 130n, etc., wherein each of the groupings or facility-related sets may be linked to a single account (e.g., associated with a recipient of the services delivered by the system's interface circuit and/or with an owner of the asset's in the grouping or set).

The system 100 operates with and, optionally, may include a plurality of disparate assets 102, for example, each being disparate as being of a different type (IoT versus electric-assist automobile) and/or serving a different core purpose and being configured to convey data regarding use of the respective assets 102a, 102b, 102n, etc. In the illustrated example, each of these respective assets is circuit-based so as to have circuitry configured to convey an indication of its use (e.g., conveying an activation light, sound, data signals, etc.). As previously indicated, however, assets that do not have such circuitry may also be used in conjunction with devices that monitor and similarly convey data regarding the assets' use incidents.

In one typical application of the system 100, the assets 102 are located and used within or around a particular facility (not shown) and each is configured to transmit directly or indirectly, over a broadband network 104a, data regarding ongoing use of the asset to the system 100 for processing of the indication. The transmissions may occur remotely and wirelessly, via one or more communication networks which may form the broadband network 104a, between the assets 102 and the communications circuitry 106.

The system 100 includes a communications circuit 106 to receive the indications, logic circuitry 110 to aggregate and further process the received ongoing-use indications via an appropriate algorithm, and an interface circuit 114 to generate a report concerning the ongoing use of said at least one of the plurality of disparate assets. As the interface circuit 114 may be a stand-alone communications circuit or may be integrated with the communications circuit 106 and/or the logic circuitry 110, FIG. 1A illustrates the interface circuit 114 with dashed lines to show that its exact position in the system 100 is flexible (other dashed lines in FIG. 1A are used to emphasize other optional aspects or indicate availability of alternative aspects). In one example, the interface circuit 114 and the communications circuit 106 are integrated as part of a data-communications server operated on behalf of a service provider that provides asset-valuation scoring services and, optionally, one or more other services including, for example, one or more other data-communications such as services involving insurance coverage, security-alarm services, etc.

The logic circuitry 110, which may be a dedicated programmed computer or part of another larger (e.g., mainframe) computer operated on behalf of a data-communications service provider, is configured to carry out, for each of the plurality of disparate assets, a set of actions which may include: aggregating the received ongoing-use indications, accessing at least one profile indicating a lifecycle associated with the asset, and selecting for execution, an algorithm from among a plurality of algorithms, in response to the at least one profile and the aggregations, to adjust a valuation score of the asset. As discussed above in connection with populating databases and/or registries to identify each of the assets, various circuits may be involved and one or more of them may include memory circuits for storing the assets' identities and further developing the populated databases or registries. As shown in the example by way of system 100, exemplary memory circuits in this regard are depicted as local memory 122 which is part of the logic circuitry 110, memory 124 which is external to the logic circuitry 110, and memory 126 which is remote from the logic circuitry 110 and in some more specific examples, accessible via the broadband network 104a and located proximate to the facility and the assets 102.

As each asset is expected to have certain lifespan of practicable use (e.g., a "lifecycle"), such a profile is used to indicate the lifecycle associated with the asset. The profile (or profiles) may also include information that identifies the assets as discussed earlier, the information to identify one or more authorized users or owners of the assets, indicating the lifecycle associated with the asset. In some instances, the memory-stored profile identifies each of the disparate asset (s) and/or one or both of a user and an owner and the lifecycle is identified via an external lookup, and as may be performed by the logic circuit 110 to identify an appropriate lifecycle.

Based on the lifecycle associated with the asset, the logic circuit 110 may select for execution, an algorithm from among a plurality of algorithms, in response to the at least one profile and the aggregations, to adjust (e.g., initiate a score from an assumed null score or change a previously-assigned score) a valuation score for the asset in view of the asset's lifecycle and an aggregation of the received ongoing-use indications. Depending on the algorithm selected for the scoring and availability of other information (e.g., concerning the particular asset or assets in a similar category), other factors may also be taken into account in adjusting the valuation score. As somewhat discussed previously, these other factors may include previously-obtained or newly-retrieved information regarding the asset's lifecycle or certain assets corresponding to the identified asset. Such information, which may include information concerning defects, social sentiment data, etc., may be retrieved by the logic circuitry 110 using data channels 111*a*, 111*b*, 111*c*, 111*d* to access external data sources and/or by requesting the communications circuitry 106 (e.g., as a data-communications server) to search for such additional data. Such previously-obtained or newly-retrieved information may occur at regular intervals and/or in response to status changes in connection with an asset or an account associated with the plurality of assets 102 and/or the owner/user. Such status changes may include a new asset being added to the plurality of assets 102, and/or the types of external information exemplified above regarding concerning defects, etc.

As with the profile(s), the plurality of algorithms may be stored, retrieved and/or selected from the local memory 122, the memory 124 or the memory 126 (e.g., if the asset is equipped to indicate the algorithm by way of its identifying indicators being associated with a certain algorithm or sufficient information to identify the algorithm/lifecycle) or an external source such as a contracted party crafting one or more of the algorithms which is a service that may be provided by third-party programmers and/or syndicated data source provider. In one specific example, an account associate with the assets 102 is also linked to at least one profile which includes preference information, provided by the owner of the assets 102, to direct a reserve financial account to be used in relation to one or more of the assets in a variety of transactions, including payments, investments, lending, donations, trading, etc., based on business rules, owner preferences, conditions, etc.

The selected algorithm, from among a plurality of possible algorithms associated with the logic circuit 110, may be retrieved internally at memory 122 or at an external site via data channel (or data feeds) 111*a*, 111*b*, 111*c* or 111*d* as a function of a simple table lookup with one-to-one correspondence between each algorithm and a set of data associated with or identifying each asset, as a function of another algorithm-selection third-party source (e.g., the assets' manufacturers or a syndicated data source), and/or as a function of another technique such as an AI/ML algorithm. Such an AI/ML algorithm might be initialized by inputting to one of the memories, via a configuration controller 132, certain estimates of lifecycle-related data for categories of assets (e.g., known maintenance and failure rates for washing machines, dryers, automobiles) and then using further asset-specific data as may be collected from the received data regarding use and/or the third-party source, for the purpose of learning more about the maintenance and failures and adjusting the lifecycles and various valuation-parameters accordingly. In addition to the data channels 111*a*, 111*b*, 111*c* or 111*d*, other channels may be useful for such accesses to data external to the logic circuitry 110 and are depicted as channels 111*e*, 111*f* and 111*g*, with channel 111*g* providing a connection to a broadband network 104*b* which may or may not be the same as network 104*a*. The configuration controller 132 may be implemented using user-operable logic array such as a semi-programmable PLA (programmable logic array) and/or programmable microcomputer or other form of CPU.

In specific examples concerning two such algorithms (or sets of algorithms), for a first one of the plurality of disparate assets the logic circuit carries out the set of actions involving a first algorithm that is associated with a first of the respectively different lifecycles, and for a second one of the plurality of disparate assets the same or a related logic circuit carries out the set of actions involving the second (different) algorithm (also from among the plurality of algorithms) that is associated with a second of the respectively different lifecycles. Further, the first and second algorithms may be different from one another in terms of the respectively different lifecycles, in that the each of first and second lifecycles has at least two segments, reflecting change rates of valuation scoring relative to time and/or relative to received indications of use, and one of the at least two segments associated with the first lifecycle is different than each of the segments associated with the second lifecycle. Also, the second algorithms (or second set of algorithms) may predict an event outcome after a primary useful life predictor, and a set of fitted values may be derived from a primary use model and used to inform an secondary outcome model, which may also be derived from such fitted values.

The following example may be considered helpful in understanding how the configuration controller 132 may be used in connection with the plurality of disparate assets 102 including, among other assets at a residence, a set of solar panels as a first asset 102*a* and an automobile as a second asset 102*b*, each of which is respectively associated with one of two lifecycles. These assets may be recognized as being disparate from one another at one level of distinction because either their respective core functions or respective initial lifecycles are different and disparate from one another at a second level of distinction because their respective core functions and their lifecycles are different. It will be appreciated, however, that with many or a multitude (e.g., dozens) of assets linked with a common account, "plurality of disparate assets" may include some subset of assets that are not considered disparate.

For the first asset 102*a*, the lifecycle has a first (linear- or nonlinear-) segment accounting for changes in valuation scoring in early years of its use (e.g., the initial few months of operation associated with successful operation and reflecting an appreciation). The valuation scoring may fluctuate based on other factors such as based on the amount of electricity produced by the set of solar panels (as may also be monitored by the system) being well in excess of the electricity used by the residence. This same lifecycle may have another segment accounting for later years of the asset's expected useful life (e.g., when maintenance costs and associated costs in discarding and replacing the aged set of solar panels may be even more costly and thereby reflecting an escalation of the asset's depreciation).

For the second asset 102*b*, the lifecycle has a first nonlinear segment accounting for relatively significant depreciation associated with low valuation scoring in the first few to several months of received data regarding the automobile's use and another segment accounting for later years of the asset's expected useful life when maintenance costs are high, thereby reflecting more of the asset's depreciation.

Other factors affecting the valuation scoring (and/or the associated lifecycles and parameters of the selected algorithms) include the initial location of each of the assets, any changes of location, and/or any significant incidents reported to the system 100 which may dramatically alter the lifecycle and/or the operations of the selected algorithms. Examples in this regard may be related to the type of asset and/or the location of the asset. For instance, expected or actual natural disasters and terrorists incidents may affect a wide variety of assets located in regions expecting to be impacted by the incident. In the case of specific weather-related assets, such as solar panels, changes in weather patterns, excessive rain, high winds, may affect the efficiencies and operability of the assets. Similarly, for some assets such as those producing high petroleum-related emissions (tractors, lawn mowers, gas furnaces, etc.) the logic circuitry 110 may select one of the algorithms based on social sentiment data associated with the region of operation. Consider, for example, in regions such as Boulder, Colorado and many regions near cities of the West Coast, valuations of such petroleum-operated equipment declines at much steeper rates.

Once the logic circuitry 110 produces one or more valuation scores associated with one or more of the respective plurality of assets 102, the interface circuit 114 may be used to generate a report concerning the ongoing use of said at least one of the plurality of disparate assets. Such a report may include the valuation score(s) and its association with the plurality of assets 102, and/or each such asset, and optionally additional information as may be requested and/or available from the logic circuitry 110 and its access to external data sources.

Figure 2:
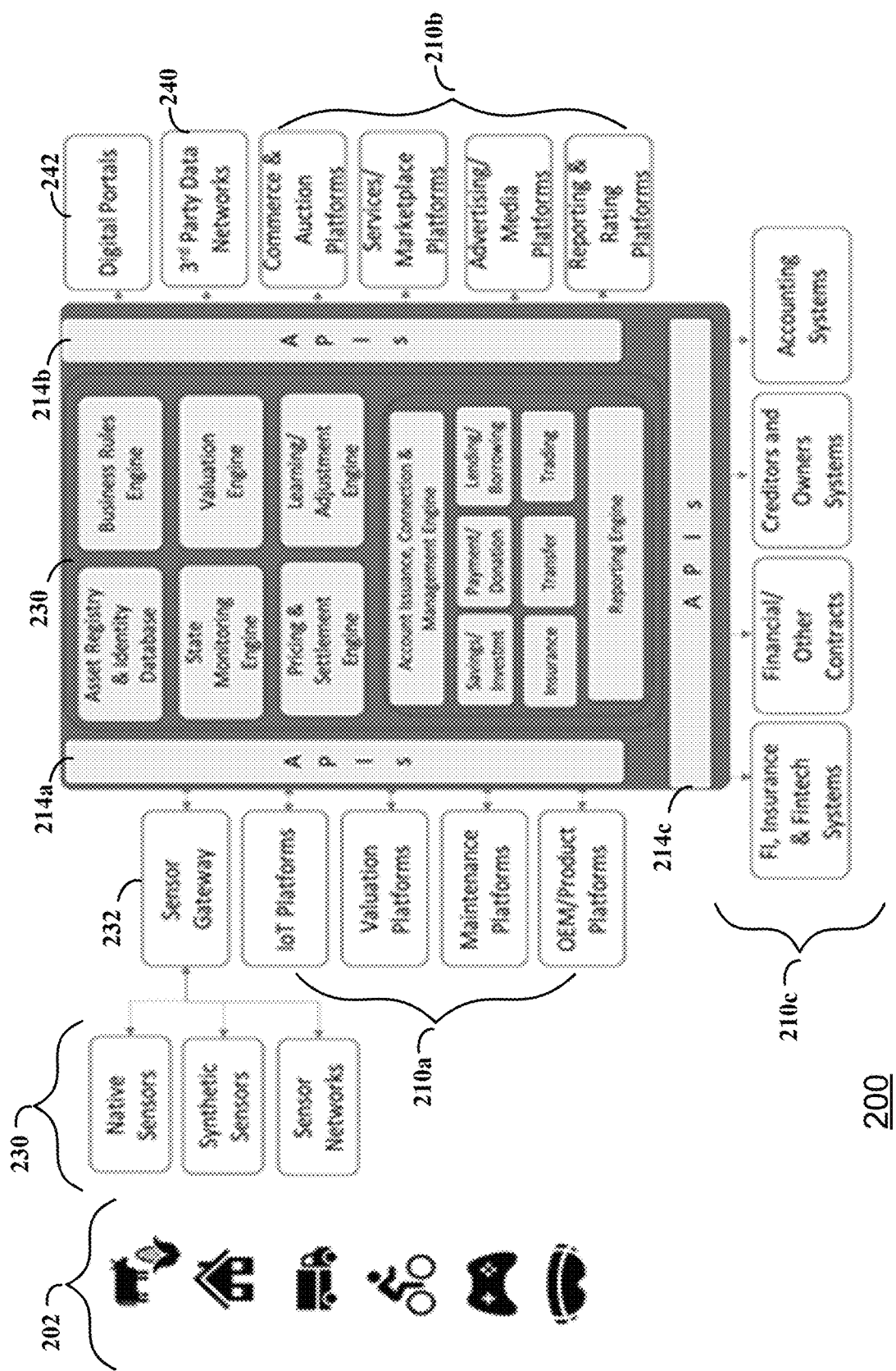
FIG. 2 is a system-level block diagram illustrating exemplary sets of circuitries and communications pathways which may be used in connection with a system of the type exemplified in or consistent with FIGS. 1A and 1B, also in accordance with the present disclosure.

FIG. 2 is a system-level block diagram illustrating exemplary sets of circuitries and communications pathways which may be used in connection with a system 200 (with similar features and subparts as the system 100 of FIGS. 1A and 1B) that receives data regarding use of respective assets 202 in real-time (or near real-time) data and processes such received data based on asset lifecycles to generate valuation scores and related data as may be used by one or more third parties via respective platforms configured to communicate with different types of third-party communication platforms at 210a, 210b and/or server systems 210c via API-enabled interfaces at 214a, 214b, 214c. For example, as shown in connection with the communication platforms at 210a, the different types of third-parties may include those serving or reporting on IoTs, maintenance of the assets, OEM/products, one or more valuation platforms associated with different types of assets as may be useful for altering lifecycle and/or selection of algorithms or parameters used by a selected algorithm in connection with valuation scoring as previously discussed. The system 200 shows logic circuitry for selecting and executing such algorithms generally at 230 as part of a CPU-based processing circuit including multiple computer-processing engines (e.g., programmed modules executed by one or more CPUs).

The plurality of disparate assets 202 may convey data regarding use via one or different types of sensors 230, as depicted, including native-type, synthetic-type sensors and/or one or more sensor networks. Examples of native-type sensors would be an IoT (WiFi-enabled thermostat, front door monitor, security system or entertainment system) having a built-in communication device to send data communications to the API interface 214a directly or indirectly through a sensor gateway 232. Examples of synthetic-type sensors are after market adapters, such as previously described use-monitoring devices and/or retrofitted WiFi-enabled sensors triggered to communicate upon use of the asset. Examples of sensor networks are WiFi-enabled WiFi routing and amplification systems and entertainment systems in which additional components (e.g., signal amplifiers/routers/speakers) may be added to the system and communicatively activated using ad hoc protocols. In each example, one or more sensor gateways 232 may be used at the facility associated with the assets 202 and/or remotely for providing the data regarding ongoing use to the logic circuitry shown generally within block 230. In a system and application which uses each of these different types of sensors 230 together, for example associated with the same asset owner and/or system account, the system 200 may receive data regarding ongoing use of a variety of different types of assets 200 including, as examples, the types of residence-based assets as previously-discussed, incidents of use as indicated by certain movements of or feed provided to animals, and gaming devices as used with entertainment systems.

As discussed in connection with the system 100 of FIGS. 1A and 1B, the logic circuitry of the system 200 may also obtain information from and send information to various types of third parties (e.g., data marketing syndication companies) through one of the APIs such as shown at API 214b and block 240. Further, one or more of the API interfaces may serve to connect the logic circuitry one or more other digital ports 242, for example, as a portal to an administrator-operated controller 132 such discussed in connection with FIG. 1A. Yet additional API interfaces are shown at 214c as providing the system 200 access to other information such as insurance and financial institution systems and services as used by service providers in connection with banking, financial contracts such as loans and leases, and systems associated with insurers, accounting, creditors, etc. providing ongoing or prospective services for the assets 202.

In certain instances, such API interfaces and third parties may involve companies in maintenance and servicing of the assets, manufacturers of the assets, financial-transaction markets, etc., to enable (e.g., autonomous) tracking of usage incidents of a set of disparate assets in connection with feedback to know when to replace specific types assets from the manufactures of such assets and/or their competitors. In this context, the blocks at 210b illustrate such third-party providers including commerce and auction platforms (e.g., ebay), and marketplace (e.g., FaceBook Marketplace), ratings (rtings.com) and advertising platforms. As illustrated, the system 200 may draw information from and/or send information to one or more of these types of companies or markets for a variety of purposes including financial and transaction purposes, and further including learning-related purposes such as modification of an algorithm selected to adjust valuation scoring in connection with noted examples as previously described. By adjusting valuation scoring in these manners, with depreciation and/or accretion to ongoing aggregations of the scoring, the practicable/functional use (health), technological life (obsolescence) and aesthetic aspects of such asset(s) may be observed and tracked via a real-time learning (e.g., AI/ML) engine, and used for a variety of purposes by the owner of the assets and/or any one or more of these commercial venues.

Moreover, by tracking use of the assets in real time, a continual stream of information is provided to help assess other issues which may have increased importance for certain valuation scoring used in certain applications. This information may serve, as a few examples, the actual conditions experienced by the asset(s) (e.g., wear and tear, location-specific eco-related environmental impacts, exogenous shock, internal conditions, etc.), eliminating gaps in assessing possible changes in value of the asset(s), and/or accuracy of true asset value (e.g., because observations do not equal experience and, in the case of manufacture quality, no two assets truly equal in value). In connection with accounting systems, such information may serve to significantly mitigate financial errors ensuing from failing to account for the total cost of ownership of (most) of the assets linked to the account, continuous changes in value of technology and aesthetics associated with the type of asset(s) such as asset cost and costs of installation, operating, maintenance, decay/depreciation, location, tax costs and the reserve (or supply chain issues) required to replace a decayed asset. After valuation scoring such assets by taking into account such a range of issues based on depreciation/accretion heuristics, technological changes, etc., human error is largely overcome as conventional accounting systems are countdown modeled or based on assumed changes, as opposed to being based on real-time, observed conditions via such sensors (230 of FIG. 2). Further, the system 100 or 200 serves to replace or mitigate involvement of inaccurate human intervention to make the continuous real-time financial transactions needed to save for or pay for the operation, maintenance, repair, renovation or replacement of the asset(s) or in the case of accretion, to borrow or trade continuously against increases in asset value(s).

On a large scale, for example serving more than 50,000 accounts with each account being associated with several or more assets, the skilled artisan may readily recognize that the system 100 or system 200 may be advantageously used in connection with many value-building business methodologies. These include, as examples: pricing, aggregation and settlement of value changes based on use of the assets; for an accounting system associated with assets, object or marketplace level to enable the saving, payment, transfer, borrowing, lending, swap, insurance, investment or other financial transactions necessary or desired for the use, maintenance, repair, renovation, upgrade, replacement, sale or repossession of the asset(s); and a marketplace communication pathway to connect the asset(s) to external accounts and market systems to enhance value such as asset lifecycle management, asset health & repair records, marketplace sale and auctions, aggregation, shopping for replacement parts or asset replacement, data streams (for use by developers, service people, other assets) and other marketplace uses of value. As a more specific marketplace example, use of the system 200 may enable assets to be used in marketplace exchange mechanisms to enhance value for the asset, system or asset owner.

According to one example embodiment, the present disclosure may involve a CPU-based server arrangement (sometimes "system") configured to collect and aggregate data about each registered or listed asset of an account owner and, based on such assets, create a health report as a form of valuation score. One or more account-linked profiles are used to identify each asset, the account, contact information of account owner, and the manner(s) preferred by the account owner for conveying particular details regarding the collected and aggregated data and including, for example, data regarding updates on use the asset(s) and of remaining life for the asset(s). For each such asset, the health report may be used to track certain data to inform the user (and in some instances, the user-owned asset and/or other selected entities authorized by the account owner) about the remaining life of the asset.

In order to provide these data regarding updates on use the assets and their remaining lifecycle, the CPU-based server arrangement is equipped to receive over one or more broadband networks (e.g., the Internet and various cellular networks) regular updates directly from each asset and/or indirectly through an intermediary device such as a server that is wirelessly-coupled coupled to each asset in/around the account owner's residence and that is configured to collect and forward asset-specific information to a remote site, via the broadband network(s), for reception by the CPU-based server arrangement. Alternatively, the CPU-based server arrangement may be co-located at or near the residence (e.g., within the residence or as part of a power-distribution substation located to serve various neighboring residences and their similar accounts in this capacity) and configured to execute actions for aggregating the received ongoing-use indications, accessing at least one profile indicating a lifecycle associated with the asset, and/or selecting for execution, an algorithm from among a plurality of algorithms, in response to the at least one profile and the aggregations, to adjust the health report (or valuation score) of the asset or assets at issue. The CPU-based server arrangement may also connect to the asset directly or indirectly to collect error codes and general messaging which may be conveyed to the account owner as part of a separate notification/or the health report.

In each such case, the CPU-based server arrangement, directly or via its proxy circuitry, receives the ongoing-use indications from the one or more assets. Then upon request by the account owner or another authorized entity, the health reports are prepare and provided for display to the account owner and/or another authorized entity. Such health reports may be provided at programmed intervals, more promptly (e.g., in real time or near real time) and in response to authorized requests for access of such reports. In each case, the system accesses the profiles and selects for execution the appropriate algorithm to adjust the health report (or valuation score) of the asset and/or assets at issue. Exemplary types of data provided in the health reports are based on the received data regarding asset use, and may include one or more of the following: amount of most recent use (over a day, week, month, etc.), overall historic usage, asset-specific usage rates over selected time periods compared to average use, anomalies of use, etc. For example, in a "smart home" wherein many of the home's appliances are enabled to communicate via a WiFi or other channels, the usage-data collection circuitry (whether the CPU-based server arrangement or its proxy circuitry) can connect to such appliances, such as the home's water and electrical supplies, to determine actual use, relatively excessive amounts of use over a short period of time, and calculate true cost of ownership. In each instance, the ensuing health report may provide adjusted lifecycle-related information based on the received data regarding asset use.

Further, by taking into account the received data regarding asset use with externally-provided data (e.g., a lookup table linking the asset type to other information, AI feeds, etc.), the CPU-based server arrangement may also augment the health report with such adjusted lifecycle-related information, and other asset-related information, to account for: manufacturer recalls; recommended maintenance or repairs, etc. It is appreciated that notifications and real-time status of the health of each asset may be provided via a variety of channels (e.g., text, email, dashboard). By using such externally-provided data, the CPU-based server arrangement can also connect to a manufacturer's system to retrieve specifications related to lifecycle based on manufacturer-maintained criteria and statistics. This type of data may include an asset type's average use, recommended maintenance plans, warranty sources, insurance providers, warranty specifications, reviews, and/or any available insurance coverage options.

In certain implementations, the system can be linked for connecting to and accessing users' financial-type accounts or sub-accounts when permissions are properly set and provided by a strict authentication process. For example, in connection with bank, investment and/or property-insurance accounts, with proper authorized linking to such accounts, the system can then deposit and withdraw money for a variety of purposes related to or leveraged from (e.g., as collateral) the asset or group of assets. These purposes may include: regular maintenance of an asset (e.g., season inspection and cleaning, replacement parts such as filters, bulbs, etc.); payment against an asset's debt; payment of warranty or insurance fees; moving money from one user account to another for the purpose of saving for maintenance, upgrading or replacing an asset; and validating an inventory of owned assets in connection with an insurance claim and/or management of insurance-related accounts for the user and/or user-owned asset within its system (e.g., automatically completing registration of newly-acquired/installed assets to the asset manufacture and tracking/conveying asset maintenance as needed to prevent a warranty from becoming void).

By linking the system to such other types of financial-type accounts or sub-accounts, the system can use data from each user's financial-type accounts (e.g. transaction histories) to ascertain or recommend various financial health measures, including but not limited to: average cash balance per day and month; current debts and payments per month; current savings and investing amounts per month; current accounts types held; past payment history; past credit card history; past savings history; and past investment history.

In other more-specific implementations involving the same type of CPU-based server arrangement (system), the system can determine the remaining lifecycle of an asset based on data aggregated and can determine an appropriate savings plan. The system can then regularly transfer monies from one account into a savings or investment account (to take into account inflation) for future use, or calculate funds over time and pull monies when full amount is accrued. Further, in real or near real time, the system can: track and report any and all assets and their associated lifecycles and available funds; increase or decrease funding to the account owner as usage patterns change to ensure funding is available when needed for repair, maintenance, or full replacement; and/or effect a loan to borrow from one asset to pay for another should an unforeseen emergency arise, or should the account be short the amount due for repair, replacement or upgrade. Each of the above exemplary types of transactions and actions can be established by the user via business rules and preferences, for example, via the aforementioned one or more profiles associated with the asset(s) and account owner.

In the above and other robust applications, the above type of system may be linked to, hosted and/or operated on behalf of a financial institution such as a bank of Fintech (e.g., a company providing financial services that relate to or overlap with the banking sector) which has access to aspects of the asset-based health report, the financial institution can communicate (directly or through the system financial institution) with the account owner to present personalized, custom financial offers available to the user and/or for the benefit of user-owned asset, and such offers can then be used to purchase, upgrade or repair the asset.

Moreover, such a system can provide personal, relevant offers to save or pay for repairs, maintenance, upgrades or replacements of assets. This type of offering is specifically appropriate given the system has access to the health report as a valuation score of the account owner's assets and also information including one or more of the following: one or more commonly used credit scoring mechanisms, current list of financial accounts held by the user, and other personal information related to the user's financial habits and preferences. Such financial habits and preferences may include, for example, transaction history, paycheck deposits, monthly withdrawals, credit card payments, average daily balance, previous savings history, current monthly savings, and monthly investments. In more specific examples, such offerings or suggestions may include one or more of the following: personal loans with a special interest rate; discounts if purchasing from a vendor in partnership with the financial institution; establishing a savings account and funding it from the user's primary checking account or other account identified by user; using existing savings and creating or moving to an investment account to increase funding; moving savings from one asset to another in order to cover an unexpected expense; using an existing credit card; offering a special finance offer on an existing credit card; and using existing savings to pay for an asset's repair, maintenance, or replacement and creating a plan to build back the reserve.

In the above and other specific examples, aspects of the present disclosure are further directed to authentication for tracking of usages of an account owner's assets and for access to databases and server systems which may reflect such assert-usage tracking. Such authentication is important to maintain privacy rights of the respective owners of the assets and/or accounts, and to prevent wrongful and/or criminal behavior which behavior may be at least in part based on knowing when and where certain assets are and are not being used. For example, with another's unauthorized access to such asset-specific health reports, certain data in or underlying an asset-specific health report might be interpreted to suggest that an asset owner has not been at a certain for an extended period of time, or to suggest that the asset owner is physically handicapped and unable to use or attend to certain appliances in or around the home. These suggestions may lead to vacant-home crimes or high-pressure sales scams such as based on telephonic communications and targeted door-to-door visits. For these reasons, certain account owners may consider asset-usage tracking to be highly sensitive information.

For the above type of system which is linked or hosted by a financial institution, at a base level linking the system to one or more transactional accounts owned by the user and/or a user-owned asset may be implemented in a convention manner, for example, using existing authentication procedures as used by financial institutions today. Similarly, for access to the system's collected information, the account owner can elect to use such existing authentication procedures.

The same types of existing authentication procedures can be used (and elected by the user) in instances where the above type of system is not linked or hosted by a financial institution. This follows as the system can be configured using the same types of remote access (e.g., sending profile and usage data to and receiving information from the system's CPU-based server).

As an alternative or additional measure of authentication, the system can establish such authentication for this type of remote access via one or more procedures which do not permit access without the user (and other entities/persons attempting to access such asset-usage information) first verifying how, when and where one or more different types of assets have been used. Preferably, such information is of the type which only the account owner would be in a unique position to know. As an example where the account owner is also the account user, consider a "smart" home in which smart appliances include a dishwasher as used almost daily and laundry appliances (washer and dryer) are used at least and typically 2-3 times per week. Only the account owner would be in a unique position to know how, when and where one or more of these appliances were used.

If further and/or alternative information were needed or desired (e.g., as in the at least one profile associated with the account owner), immediately before the attempt to access, the account owner may elect to activate one or more of features of certain appliances listed in the profile for implementing real-time creation of a code needed for access (e.g., remotely starting an automobile engine, cycling accessory power to the engine running a garbage disposal to activate a burst of electricity on the residence's related power circuit while simultaneously activating the flow of water at the kitchen sink. Similarly, with usage of smart-home appliances being monitored by the above-described type of system according to the present disclosure, he account user can momentarily activate a sound-system's amplifier and/or lights from a remote location. In each instance, only the account owner and the above-described type of system would know when, where and/or for how long such appliance-use incidents occurred. By augmenting currently-available authentication procedures (e.g., as referenced at https://developer.usbank.com/api-library/account-validation/ver-1.2) with verification associated with such particular usage of monitored assets, even in the presence of identity theft and knowledge of passwords used at financial institutions, account owners and operators of the system's implementing the asset-usage tracking can closely monitor and securely maintain such sensitive information for the comfort and safety of the account owner.

Accordingly, especially with such heightened security-access and authentication procedures, the above type of system can be configured to perform many autonomous financial transactions in a same manner. Such transactions may include: depositing or withdrawing funds (e.g., fiat or digital money, use rights, tokens, cryptocurrencies, energy credits) on behalf of the account owner, asset user or the asset itself. Also used asset-related accounts can be linked to external accounts (financial institutions, loyalty currency accounts, layaway accounts, insurance, warranties, etc.) or kept internal to the system with the data and the assets being private and used solely by or on behalf of the owner of the user or by the asset, itself (e.g., for servicing or replacing a washing machine).

Consider an example of such a system configured to track assets of User A, who is a saver. Based on usage and other data aggregated by the system, the system uses the usage reports to select and execute an asset-specific algorithm to ascertain the lifecycle of the asset which, in this example, is a combination washer and dryer. Via the health report indicating a low valuation score and/or indicating in plain sentence form, the system alerts the user that their current washer and dryer set is due for replacement in 9 months. By using aggregations of the asset's usage data and by way of the user's financial-transaction history and/or other financial projection resources, the system calculates or provides: an average savings rate/month; existing outflow of debt, bills and expenses; and average daily balance. The system may then recommend creation of a savings account that will automatically pull $110/month from the user's checking account over the next 8 months in anticipation of the account owner purchasing a new combination washer and dryer to replace the current one which has a fast-approaching end-of-life.

Also according to use of the above-discussed system type, another example involves User B whose financial history shows no history or experience of regular saving. Based on usage and other data aggregated by the system, the system provides an alerting communication to the user (e.g., in a manner similar to the alert in the above example) that the currently-installed washer and dryer is likely to fail in 3 months and/or has a 75-85% likelihood of manifesting sometime of maintenance service within 4 months (e.g., due to lifecycle factors, ongoing aggregation of use and/or other external reports). The system, by using such a health report and the user's transaction history, notes as an input to its decision-making programming steps (e.g., AI/ML and/or hierarchical) that User B has no savings at present, has no history of saving for large purchases, but has a good credit score. By accessing other financial resources such as existing outflow of debt, bills and expenses and the user's average daily balance, the system recommends a short-term personal loan at a rate personalized for User B, including a monthly payment that fits within their budget.

FIG. 3 is a high-level block diagram, also in accordance with the present disclosure, showing another specific example system 300 similarly constructed as disclosed in connection with one of more of the previously-presented system embodiments such as system 200 of FIG. 2 and wherein the assets at issue for system 300 are "smart" (e.g., equipped with sensors 230 of FIG. 2) and are associated with a residence or facility as depicted in the two-story building 310 such as an asset-owner's residence. In this example, the assets are illustrated as including, among others, a garage door opener 312, a heat pump 314, a washer/dryer unit 316, additional HVAC equipment including a furnace 318, and another non-appliance aspect of the building 310 such as roof 320. For these particular assets, the system 300 may be configured to provide generated reports including value scoring based on tracking use incidents of each asset, and may be used for lifecycle planning in connection with asset-replacement investigations and bidding, management and receipt of notices associated with recalls and servicing of the assets, authorizations for warranty registration, and support for obtaining and rendering appraisals of one or more of the assets or the building 310 including the assets.

In operation, each of the smart assets may provide valuable information, along with the use indications in the form of digital data sent to the system 300 over one or more broadband networks (e.g., Internet, cellular network(s), etc.), that is likely to affect the applicable algorithm's valuation scoring for the asset(s). In the example of system 300, received usage indications and/or supplemental data with the usage indications reveal in real time that: for the garage door and/or opener 312 there has been 5,124 cycles of use, for the heat pump 314 (with further data conveying or data deduced from the received usage indications) the coolant level is at one hundred percent, and for the washer/dryer unit 316 (with registration data revealing that the extended warranty expired on Sep. 30, 2020) that installation occurred on Sep. 12, 2012 and that the sole maintenance occurred on Apr. 27, 2016 which may render the warranty as being void. The system 300 may also have access to a third-party API platform that regularly receives maintenance reports for the washer/dryer unit 316 and as such, the valuation score may be accordingly adversely affected.

Similarly, for the furnace 318 and roof 320, the received data regarding use (and/or related data sent by way of the data picked up and forwarded to the system 300 via the asset's configuration and smartness) attributes regarding the status of maintenance items and operation for the furnace 318 and for the roof 320, manufacturer name and roof-tile model numbers. For property appraisals, such data would be invaluable, particularly individual valuation scores for each such asset and such related data (whether deduced from the usage indications or supplemented by the smart asset).

For the specific configuration and application shown in connection with system 300 of FIG. 3 and/or other examples, there may be many specific components used to implement the various communications involved between the central system (receiving the data regarding use, selecting and executing the appropriate algorithm, etc.) and the assets or sensors associated with the assets. This communication may be implemented via a microcontroller chip such as is typical in an IoT Platform or other smart system which is enabled as an edge device for fog-based or cloud-based data and processing. The on-site sensors (e.g., sensors 230 in system 200 of FIG. 2) may be implemented using a client/server architecture (respectively as sensors 230/system 200), or similarly arranged in a mesh or edge architecture, or in a distributed ledger or block-chain architecture (similar to smart decentralized objects) using decentralized applications ("dapp", as may be built on a decentralized network that combines a smart contract or set of operating rules and a frontend user interface), and executable smart contracts to track oracles for state changes. In other implementations, such sensors may be used in passive objects (statues, non-mechanical, etc.) as opposed to active objects which actively operate in a electromechanical sense or operate continuously or cyclically), and in certain instances, the sensors reporting the use indications may be smart agents implemented as software engines (e.g., run by one or more on-site computers that monitor and keep track of objects). In yet further implementations such sensors may be used to enable valuation, reserves, exchange or other transactions denominated in fiat, digital, crypto or virtual currencies, and other forms of value which may be contextual to the object/asset and a particular use case (e.g., time, location, use, energy, loyalty points or credits).

Two additional example implementations are provided below, with occasional reference to the system 100 of FIG. 1A. In these examples, reference may also be made to the engines depicted in system 200 of FIG. 2, and in each example certain activities (e.g., on-boarding, data intake, database and DB analytics and a learning engine using AI may be used to create and improve asset valuation and selected algorithms). The first example is directed to an exemplary set of steps for implementation of a "household" application as described by way of several steps numbered 1 through 9, as follows.

1. Customer buys a new washer and dryer and the assets are on-boarded to the customer's asset registry database (e.g., accessible by the logic circuitry 110 of FIG. 1, whether a local memory 122 or one of the other databases), with details on the location, make, model, specs, trim and aesthetic markers, serial number, lifecycle updates (recalls, most recent software download, etc.), and relevant documents such as the purchase receipt, warranty, user manual, etc.
2. The beginning value, based on price, less post-purchase used discount based on class, model, etc. resale experience, is recorded as the beginning value in the valuation engine, and starts to deprecate on an ongoing basis at a rate based on the useful life of the asset and related factors such as expected time to effective obsolescence.
3. Internal sensor feeds, external sensor(s) feed(s) (e.g., from outside systems, say the OEM that created the washer/dryer) and/or "synthetic" sensor feed(s) are connected and activated, to record state changes in the state monitoring engine.
4. Via a third-party service provider's engine which is communicatively coupled to the system 100, a financial account is issued for the benefit of the new assets and connected to the customer/owner's financial account of choice.
5. Each time a load of laundry is run through the washer, or say the dryer, the value of the washer and/or dryer are deprecated by a value predicted by the engine(s) associated with pricing, aggregation and/or settlement, as well as the sensed deprecation as reported by sensors.
6. The logic circuitry 110 selects an AI/ML algorithm which operates as a learning engine and which takes the deprecated value and applies machine learning and AI techniques to improve the accuracy of the valuation and adjusts the depreciation or accretion algorithm based on actual experience vs predicted (e.g., each thing has a predicted depreciation or accretion and an actual depreciation or accretion. The learning & adjustment engine monitors predicted depreciation against actual sensor/observed depreciation and learns from differences) and adjusts the pricing of each depreciation/accretion factor for the washer and dryer as it learns.
7. With reference to the engines depicted in block 230 of FIG. 2 and based on the parameters set in the Business Rules Engine for the washer/dryer, each period and/or "$n^{th}$" cycle or in real-time, the Pricing/Aggregation/Settlement engine aggregates the total of the deprecated amount, and by contract, settles and moves that amount of funds from the connected owner's account to the account the system set up for the benefit of the washer/dryer and its owner, for instance to attain funds needed to fix, upgrade or replace itself over time. This may be deemed a reserve account which grows in value as the asset/object is used.
8. Also in connection with block 230 of FIG. 2, for each period and/or "$n^{th}$" cycle or in real-time, the Reporting Engine records this transaction to the owner's accounting system and the washer and dryers "asset health report", as well as to any other system programmed to receive this data.
9. Based on the parameters set in the Business Rules Engine, each period and/or "$n^{th}$" cycle or in real-time, digital contracts are executed to connect the asset(s) to market tools such as advertising/marketing (deals for laundry products), auctions (assuming every asset is for sale at the right price) and reverse auctions (when shopping for supplies, upgrades or for a replacement for the washing machine and/or dryer), aggregation (collecting transactions via a third party aggregator), asset health & repair records (for maintenance, warranty and other uses), shopping for replacement parts/add-ons, shopping for asset replacement, data streams for use by developers, service people, and other assets, and other marketplace uses of value.

The second example is directed to another set of exemplary steps, some of which may track similarly with the above first example, but in this example regarding implementation of an "automotive" application. The steps are numbered 1 through 10, as follows.

1. Customer buys a new truck which is on-boarded to the customer's asset registry database, with details on the location, make, model, specs, trim and aesthetic markers, serial number, lifecycle updates (recalls, most recent software download, etc.), and relevant documents such as the purchase receipt, warranty, user manual, etc.

2. The beginning value, based on price, less post-purchase used discount based on class, model, etc. resale experience, is recorded as the beginning value in the valuation engine, and starts to deprecate on an ongoing basis at a rate based on the asset's expected useful life and factors such as expected time to effective obsolescence.
3. Internal sensor feeds, external sensor(s) feed(s) (e.g., from outside systems, say the OEM that built the truck) and/or "synthetic" sensor feed(s) are connected and activated, to record state changes in the state monitoring engine.
4. A financial account is issued for the benefit of the new assets and connected to the customer/owner's financial account of choice.
5. Each time the truck is driven, the value of the truck is deprecated by a value predicted by the pricing/aggregation/settlement engine based on the time and length of the trip, as well as the sensed deprecation as reported by sensors (e.g., someone accelerates and brakes harder than average, or lets the engine idle, etc.) The Learning Engine takes the deprecated value and applies machine learning and AI techniques to improve the accuracy of the valuation and adjusts the depreciation or accretion algorithm based on actual experience vs predicted (e.g., each thing has a predicted depreciation or accretion and an actual depreciation or accretion. The learning & adjustment engine monitors predicted depreciation against actual sensor/observed depreciation and learns from differences) and adjusts the pricing of each depreciation/accretion factor for the truck as it learns.
6. Based on the parameters set in the Business Rules Engine, each time the truck is driven, the value owed on loans, leases and/or auto insurance can be aggregated based on the time and length of the trip.
7. Based on the parameters set in the Business Rules Engine for the truck, each period and/or "$n^{th}$" cycle or in real-time, the Pricing/Aggregation/Settlement engine aggregates the total of the deprecated amount, and by contract, settles and moves that amount of funds from the connected owner's account to the account the system set up for the benefit of the truck and its owner, for instance to attain funds needed to fix, upgrade or replace itself over time, as well as attain funds needed to pay for loan/lease installments and/or insurance premiums. In essence, this is a reserve account which grows in value as the asset/object is used.
8. Based on the parameters of the Business Rule Engine for the truck, each period and/or "$n^{th}$" cycle or in real-time, each time a loan or lease payment is due on the truck, the truck's account can pay said installment via a digital contract that draws from the connected account to make the payment. Likewise, when auto insurance premiums are due, those payments can be drawn on the truck's account.
9. The Reporting Engine, each period and/or "$n^{th}$" cycle or in real-time, records this transaction to the owner's accounting system and to the truck's "asset health report", as well as to any other system programmed to receive this data. For instance, since the truck was financed, the reporting engine could report the actual collateral value or lease residual of the truck to the bank's/lender's/lessor's accounting system directly.
10. Based on the parameters set in the Business Rules Engine, each period and/or "$n^{th}$" cycle or in real-time, digital contracts are executed to connect the asset(s) to market tools such as advertising/marketing (deals for truck fuel/products/servicing or deals to advertise on the truck's tail or window displays), auctions (everything is for sale at the right price) and reverse auctions (when shopping for fuel, supplies, servicing, upgrades or for a replacement for the truck), aggregation (collecting transactions via a third party aggregator), asset health & repair records (for maintenance, warranty and other uses), shopping for replacement parts/add-ons, shopping for asset replacement, data streams & telemetry for use by developers, businesses, service people, and other assets, and other marketplace uses of value.

In connection with each of these above examples and related discussion in the present disclosure, calculations/specific-processes are meant only to be illustrative of how usage volumes can be assessed by common standards, weighted by class of asset and individual household usage, and applied as an input to predict the depreciable life of the asset. They are not meant to be reflective of the solution's actual weighting characteristics or usage calculations for this asset class or of any other asset class exemplified by the present disclosure. Such examples are merely compiled to articulate the fundamental method for assessing (e.g., household) usage of a particular asset class relative to the mean usage pattern and thus predict an alternative, more accurate, depreciation schedule.

Figure 4A:
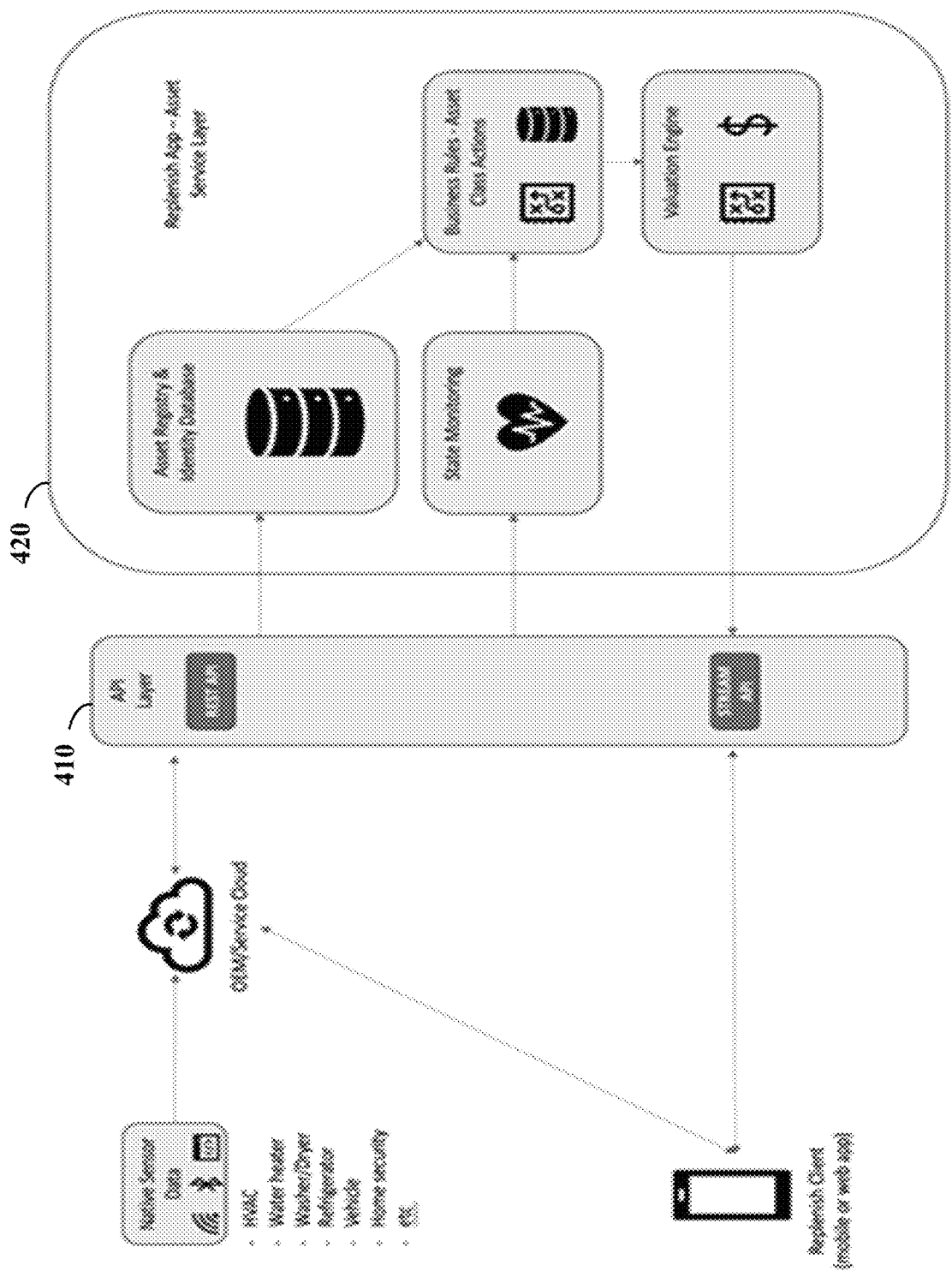
FIGS. 4A and 4B are block diagrams respectively illustrating front-end and central-portions of a system such as the type illustrated in connection with one of more of the previously-presented figures, also in accordance with the present disclosure.
Figure 4B:
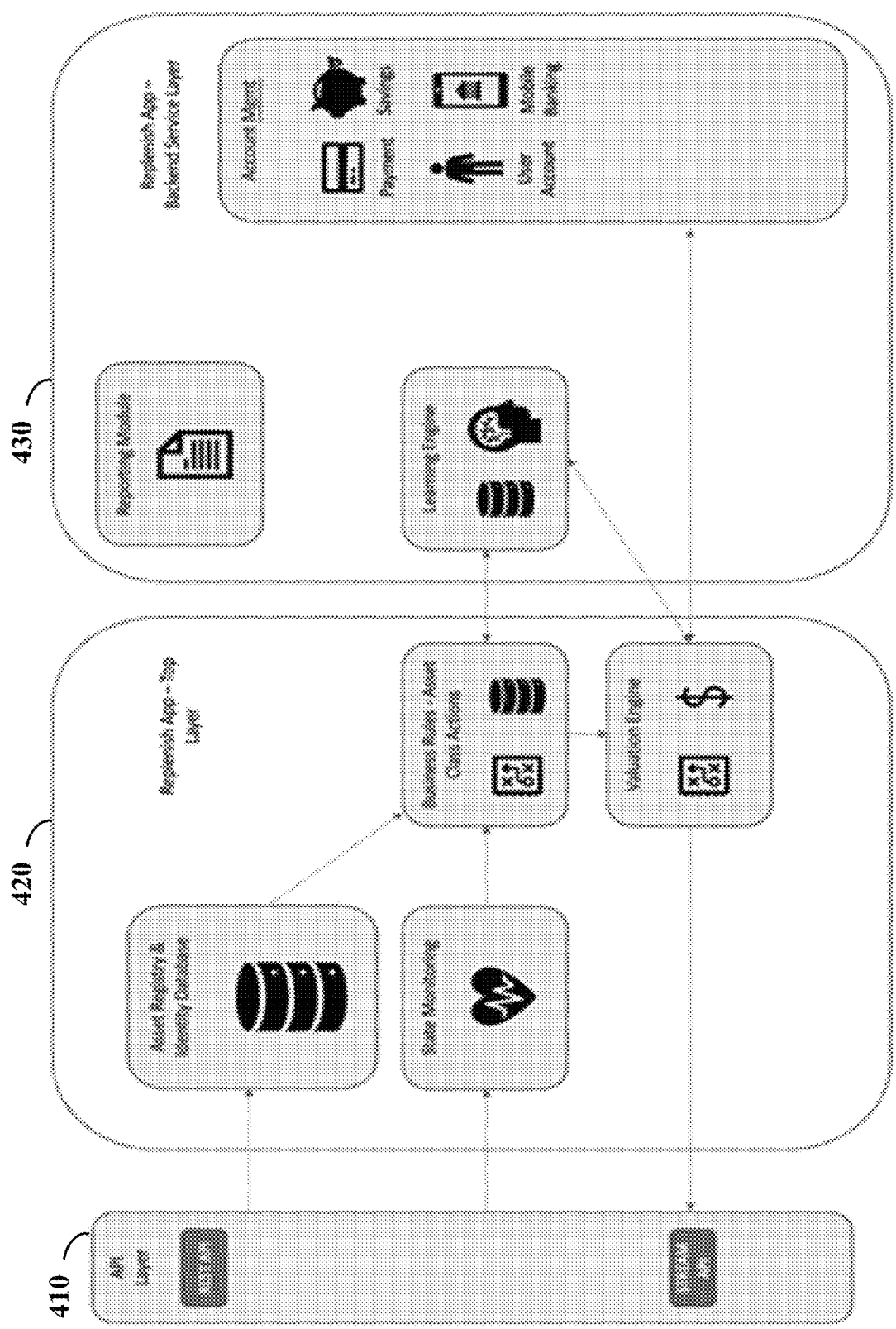

FIGS. 4A and 4B are block diagrams respectively illustrating data flow from a perspective showing front-end and down-stream portions of a system such as the type illustrated in connection with one of more of the previously-presented figures, also in accordance with the present disclosure. In the data flow diagram of FIGS. 4A and 4B, several application modules would be involved in processing, storing, and triggering business rule-based actions as a result of the calculations performed to measure household usage of an asset. There may be a variety of inputs used for asset classification and end of life (EoL) cost analysis. These inputs may include, but may not be limited to, those inputs discussed in connection with FIGS. 1A and 2. For the purposes of articulating detailed examples relating to the above household example, the process flow shown in FIGS. 4A and 4B is representative of another specific embodiment and related specific application according to the present disclosure. The example illustrated by FIGS. 4A and 4B, which are largely self explanatory, follow activities in a household in which an owner or resident has purchased a new gas-powered water heated with an integrated smart sensor and who elects to leverage the system(s) and methodologies discussed in connection with the previously-discussed examples to plan for the asset's eventual replacement. In this case, the water heater is purchased and installed in new condition, which represents the full operational lifetime of depreciation applied to the asset.

In FIG. 4A, the illustrated API layer 410 includes two types of APIs, a REST API and a stream API. The REST API is an API that conforms to known REST design principles or to a representational state transfer architectural style. This API may be used to register initial aspects for each asset over the Internet (e.g., with the OEM of the asset and/or to the database used by the system's logic circuitry). The stream API is a more commonly-used API (e.g., downloadable to a smartphone or other smart asset) and used to stream API data feeds described previously as data regarding usage incidents being provided from the smart assets or other on-site sensors to a central part of the system at 420.

FIG. 4B illustrates, as in FIG. 4A, the above API layer 410 and the central part 420, and further illustrates a backend part 430 of the system including aspects that overlap with activities associated with the logic circuitry 110 and the interface circuitry 114 of FIGS. 1A and 1B. These central and backend aspects include various engines such as described above in connection with FIG. 2. They may include, as examples, a reporting engine, a learning engine and a backend service layer which may be internal or fed with data from a third party.

More detailed/experimental system having various applications. As may be helpful in understanding the applications of such a system as shown in connection with the above examples including but not limited to those described in connection with FIGS. 1A, 1B and 2, the following discussion is directed to a robust example involving details of an experimental system including many of the above-discussed aspects wherein a plurality of disparate assets may be appreciated as referring to or including assets, for example, which are dissimilar in terms of the following: (i) assets made by or on behalf of different manufacturers and in which protocols or websites used to provide access to the assets' ongoing use are different (e.g., they may be incongruent, in different formats or languages, and/or at unrelated sites or URLs); (ii) the assets provide different types indications of usage (e.g., by providing differently-formatted digital data sent from the assets, one asset providing digital data and another providing analog data, providing different forms of analog data, etc.); (iii) assets situated at different types of venues (e.g., residential facility versus industrial facility); and/or (iv) assets being monitored and usage-tracked for different purposes (e.g., one asset providing emissions (or carbon-footprint-related) reporting and accordingly tracked for this purpose, another asset being tracked to trigger an alert to the asset's owner regarding the asset's lifecycle (e.g., that the asset's warranty has expired, that now is a good time to start saving money to replace the asset or that the asset should be replaced and/or that a replacement-type asset or financial/insurance-related product or service is available for the asset). As may be appreciated, according to the present disclosure, there are many different applications for such embodiments involving tracking usage of disparate assets. Certain of this attributes (for being disparate) may be appreciated, for example, in the context of a residence in which one asset is an air conditioner (AC unit) being monitored for energy efficiency, time of use, and/or for alerting the owner of a lifecycle issue (e.g., need for maintenance) and another asset is an automobile for which its usage, mileage, venue of use/storage, etc. is tracked for financial considerations (e.g., depreciation and/or possibility of replacement and/or related promotions regarding possible replacements and/or the availability to obtain financing for the possible replacement).

This particular example experimental system includes and uses the following components, starting with an Asset Registry & Identity Database. The Asset Registry & Identity Database is used to onboard an asset (e.g., adding an asset (aka "object"). This may involve the database and related CPU accessing the database such that the database: takes in its related data, analyzes that data, takes action based on a business rules engine, and learns from that data and decisions to improve the system. The asset registry and identity database may include one or more items such as follows:

- A registry of all the assets and objects that are onboarded for value tracking
- Identity attributes (e.g., serial number, version, network connections, other attributes, etc.)
- Ownership structure and owner(s) of the asset
- Beginning state
- Beginning value (cost method, price, appraisal, assumed, etc.)
- On/off cycle
- Normal operations
- State changes and logging
- Updates available or recalls
- Error states & abnormal (out of standard) operation
- Maintenance & service intervals (scheduled vs actual)
- Warranty(ies), indemnifications
- Sensor data that is analyzed to demonstrate use
- Location data
- External data (sensed forces on an object or around it)
- Class data (all about itself and its class(es) of things like it, complementary to it,
- Experience of each factor across the class of the object (by the born-on date, brand, features, etc., what is the curve of the experience for a given factor)

The experimental system includes logic circuitry, as discussed previously in connection with selection of an algorithm for value scoring associated with the monitoring of use incidents and depreciation/accretion of the asset(s). The system intakes or creates a starting value for an object, depreciates that object based on use, technology, aesthetic, and adjustment/correction factors, where depreciation is the decline in value and accretion is the enhancement of value. The starting value may come from sources including born on date and details from as asset's chip, calculated from manufacturer's serial number, and/or connection to an external database. Such connection to external database or other connected sites can be maintained if desired to monitor in real time (if desired) the ongoing market value of the product using exact comparable assets or assets within the class of assets. Starting value can also be attained from appraised, inspected or other inputs, drawing from other systems via APIs or other technology.

According to one example selected algorithm, available from various types of pre-stored and/or algorithms evolved in real time, use vs actual age depreciation or accretion is settled each nth interval, where use is equal to: use, cycles (e.g., as incrementable depending on the asset or object, such as miles for a car, or loads of laundry for a washing machine, or time for a light, etc.); sensed wear & tear (electrical draw, heat, vibration, water draw, etc.); external stress (weather, light, temperature, vibration, altitude, etc.); and/or location or location changes.

Another factor which may depreciate and/or appreciate concerns or is referred to as Aesthetic/Style persistence, or decline vs actual age each nth interval (such interval can be denominated in time, version, series, or other interval increment). In this context, aesthetic aging corresponds to or may be derived from comparison of an object or asset based on aesthetic/style/brand/quality or other desired valued indicator, with all other similarly classed objects available in the open market (e.g., what is being added in terms of trim, features, etc., what is selling, what isn't, etc.).

Yet another related factor may account for technological persistence/obsolescence vs. actual, each nth interval, where obsolescence aging corresponds to or may be derived from comparison of asset or object based on technological capability, with all other similarly classed objects available in the open market in terms of partial or full specs.

Yet another factor is financial useful life vs. asset value, each nth interval, where financial aging which corresponds to or may be derived from: given the true cost of using an asset, comparison of asset based on financial cost to operate on an ongoing basis, (including costs such as energy, space rent/lease, maintenance costs, expected repair costs, licensing costs, tax costs, etc.) vs. the asset's remaining life value; tracking to that specific point where an asset's remaining life value and it's operation cost surpasses the useful or remaining value of the asset; and/or tracking this breakeven point against the cost/value of a replacement asset in the same asset brand, family, style or asset class.

The experimental system may further include a state monitoring engine and a learning and valuation score adjustment engine. The state monitoring engine tracks the use of an asset or object from data collected from outside systems or from the object or asset itself via: native sensors of various types that are able to sense & report (or otherwise be read) changes that are embedded or attached to the actual asset; synthetic or general-purpose sensors that are able to sense changes without being embedded within the actual asset; and sensor networks, such as smart cameras, security systems, mobile sensors, geolocation, etc. With other sensing/monitoring circuitries, other observational methods may be used such as temporal changes, "oracle"-based state changes, software code that accesses state changes, updated appraisals, inspections or other valuation inputs/data.

The learning and adjustment engine operates to perform one or more of the following activities. First, applies machine learning and AI techniques to improve the accuracy of valuation. Second, adjusts (similar to a synthetic actuator) the selected (depreciation and/or accretion) algorithm based on actual experience vs predicted (e.g., each thing may have a predicted depreciation or accretion and an actual depreciation or accretion). The learning and adjustment engine may also monitor predicted accretion/depreciation against actual sensor/observed accretion/depreciation and learned from different sources. Further, this engine may learn from its own experiences as well as the accumulated experience from its "nth" other things which are similar in type (e.g., room use type such as with a washer and dryer and/or in other ways. This engine may also adjusts the weighting of the valuation scoring (e.g., related pricing) associated with each depreciation/accretion factor for each asset.

Further and as depicted in FIG. 2, the experimental system may include additional engines such as: a Pricing, aggregation & settlement engine; a Business rules engine; a marketplace exchange interface; an account issuance, connection and management engine; a savings, investment, payment & transfer engine; and a lending, borrowing, trading, insurance & donation engine. Exemplary functions of each such engine are discussed below.

Pricing, Aggregation & Settlement Engine.

Each such asset (or thing) starts out with a value or cost (can be inclusive of total cost to operate such as fuel/energy, predicted maintenance & cost to operate, ongoing supplies, predicted replacement parts, loan/lease payments, insurance premiums). Alternatively, this value/cost may be expressed as a debt that the device must repay to be able to replace itself. The actual depreciation (or accretion) is defined by the depreciation engine as above. The pricing & settlement engine takes the predicted depreciation or accretion equation, inclusive of the factors defining the depreciation (e.g., use, cycles, sensed wear & tear, external stress, aesthetic/style decay, technological decay, etc.), and sets a price on each depreciation/accretion factor. The pricing can be denominated in currency (fiat, digital or crypto) or in other units reflective of the value of the resources available in context of the object or asset (e.g., where resources=money, time, use, electrical charge, credits, points, style, etc.). Incremented depreciation or accretion and operation expenses can be aggregated based on and until set parameters are reached or can be instantly settled with one or more of internal or external financial accounts based on rules set by the business rules engine.

Business rules engine. This engine may include the algorithms or models that coordinate, run and improve the system and this engine may also maintain marketplace mechanisms to connect to outside commerce and exchange, including: (a) business rules set up or altered over time for up to "n" things registered in the registry database including (not limited to) onboarding, depreciation/accretion factors, geo-temporal factors, pricing, observed states and state changes, internal or external standards or oracles, transactions, currency or non-currency incrementing, settlement, system use/pricing, risk adjustments, etc.; (b) functions to create, track and enable transactions of ongoing expenses to owning and operating an object or asset; (c) functions to create, track and enable execution of contracts, lending, borrowing, settlement, trading, donation, ownership, and other transaction terms; (d) the valuation and resulting financial activity and data can be aggregated and used to create an asset or object score or otherwise used for underwriting lending, borrowing, trading, investment and/or other risk/reward-based activities; and (e) activities relating to the use of machine learning, and other applicable AI/ML techniques, to test, learn and improve upon business rules which can render the system more accurate.

Marketplace exchange interface. A marketplace exchange interface, as also briefly described, may be used to connect to outside commerce. This may include, for example, a marketplace exchange mechanism to connect asset(s) to market tools such as advertising/media, sales, auctions, aggregation, asset health & repair records, shopping for replacement parts/add-ons, shopping for asset replacement, shopping for investors, data streams for use by developers, service people, and other assets, and other marketplace uses of value, etc. Illustrative examples include asset lifecycle management and proactive smart objects transactions and asset Valuation Data APIs and transactions. Examples of asset lifecycle management and proactive smart objects transactions may include: Maintenance & Repair interval management & scheduling;

Recall management
Extended Warranty bidding
Competitive Replacement Bidding
Competitive add-ons/upgrade bidding
Proactive Sales
Digital collateral release or repossession
Auctions and bidding
Borrowing and repayment
Repossession
Donation
Recycling
Examples of asset Valuation Data APIs and transactions may include:
Accounting systems APIs.
Accounting for real time balance sheet value
Appraisals, manual or digital
Inspections, manual or digital
Smart digital titles
Insurance/warranty authorization/logging and claims
Lease residuals
Collateral tracking
Health record of object(s), proving maintenance and health of assets, such as a home health report or livestock/crops health report Identity/brand data of objects History of state changes (how old is it, how soon is it to needing replaced, etc.)

Marketing, advertising and offers to owners of objects

Account Issuance, Connection and Management Engine (virtual or actual account). This type of engine may carry out activities including connecting the asset or object to one or more accounts and sub-accounts, in which deposits and withdraws are made to account for savings, borrowing, trading, lending, investing, payments, and other activity that can take place. Such accounts can be: monetary (digital or fiat) or incremented in other forms of value, such as energy, use rights, loyalty currencies, cryptocurrencies, etc.; external to the object (e.g., bank accounts, mobile accounts, loyalty accounts, etc.) or internal to the system or object for it to use; owned/under the control of the asset/object's owner or by the object/asset itself (e.g., assuming it has the software/intelligence to manage it in a self-sovereign way); and/or actual accounts that persist, can be virtual accounts that persist, can be virtual accounts created for up to "n" transactions, etc.

Savings, Investment, Payment & transfer engine. The system may include a savings, Investment, Payment & transfer engine which can be configured to carry out the following tasks:

As each depreciation/accretion factor is observed by the computer, that priced amount of value is transferred from an account connected to the object or asset and into an account for the benefit of the object and/or its owner, for instance to attain funds needed to fix, upgrade or replace itself over time. In essence, this is a reserve account which grows in value as the asset/object is used and otherwise depreciates/decays over time.

Alternatively, aggregation of each priced amount, aggregating until up to "n" amounts are attained at which time the transfer can occur Ability for that saved amount to be invested to earn income to keep pace with inflation or for its owner's account.

Payments and/or transfers to be made from time to time, using any of a myriad payment methods Payments to be made for a myriad of allowed transaction types, including purchases, donations, lending, etc.

Lending, borrowing, trading, insurance & donation engine. Further, the system may include and/or use a lending, borrowing, trading, insurance & donation engine which has abilities for an asset (or object) to be able to borrow for an amount it may be short of in its reserve account to be able to fix or replace itself, an ability to lend its reserve account to another object(s) for a period of time to enable that object to borrow an amount that its short, and/or an ability for up to "n" things to create a network in which to lend, borrow, trade, insure or donate resources with (to) each other, where such resources correspond or refer to any one or more of: money, time, use, electrical charge, credits, points, style, etc.

Further, as discussed in connection the interface circuitry 114 of FIG. 1A and/or one or more the digital (data-feed) ports and APIs of FIG. 2, one or more of the above mentioned aspects or engines may communicate with the interface circuitry to receive reports (and in some instances send back requested reports) from the interface circuitry which in this instance may be referred to as a reporting engine. The reporting engine may act to perform such tasks as to:

Display(s) (native or synthetic) to get information for the platform for alerts, activity, changes, decisions on transactions, or otherwise interact with the system Data streaming to other engines within the system or to external systems, such as the owner(s)' accounting system, an operation and maintenance system, other database systems (such as home sales/leasing systems, a loan/collateral system, a trust/custodial system, a farming system for crops/livestock), an auction system, an insurance and/or warranty system), an e-commerce system, a distributed ledger and/or blockchain system, an oracle system, etc.

In the context of the above detailed exemplary system, it is appreciated that different (e.g., more-complex or less-complex) algorithm-specific examples may be used in connection with the above-characterized experimental system.

An example set of assumptions, as may be applied to a particular implementation associated with one or more of the above specific system-level embodiments, may be based on information known from the U.S. Department of Energy (DoE). The DoE has made known that different draw patterns for water heaters on a daily basis may impact the efficiency and usefulness of this class of HVAC asset. This data is representative of the population mean by way of empirical statistical sampling published by the federal government and relates specifically to the asset type (heat pump water heater, 50 gallon capacity, with electric resistance storage of 50 gallons). It is also known that the current mean pattern of draw for water heaters of this classification indicate the following (example numbers included below for illustration): average volume removed is 64.3 gallons; number of daily draws is 6; and range of flow rates in gallons per minute is 3.

For purposes of this example, it may be assumed that each water heater remains in standby mode for a total of X hours (e.g., 24 hours-aggregate daily draw hours).

An example set of calculations for a usage model in this context may have the daily energy usage calculated for an asset in such a class as given by the DoE:

$$E_i = m_i c_{p,i}(T_{i,out} - T_{i,in})$$

where: E=the energy removed per draw; m=the mass of water removed in a draw; c=the specific heat removed in draw i, computed at the mean average outlet temperature and inlet temperature measured during the draw; $T_{out}$=average outlet water temperature of the draw $T_{in}$=the average inlet water temperature of the draw; and i=the individual draw.

The daily energy usage of the values can then be used to identify an overall energy factor, also defined by the DoE as follows:

$$EF = \sum_{i=1}^{n} \frac{m_i c_{p,i}(T_{set} - 58° \text{ F.})}{Q_{dm}}$$

where $Q_{dm}$ is modified periodic water heater energy consumption, m is the mass of water removed in a draw, and c is the specific heat removed in draw i, computed at the mean average outlet temperature and inlet temperature measured during the draw across the population in the asset class. By determining the energy factor of the periodic draw average for a water heater asset in this class, any deviation from the population mean rate of use can be calculated across all assets of this class.

Accordingly, each incremental unit will proportionately increase or decrease the energy factor of the water heater's usage ("EF") by the incremental value of change, aggregated for each day's usage and further aggregated on a monthly interval. The result may be a usage score tied to the calculated energy factor of the individual household's water heater. This can then be used to identify either an incrementally slower or faster rate of depreciation of the asset relative to the population mean usage pattern.

For most individual households, consumption can be monitored via a "smart" device integrated with the water heater that monitors the usage variables outlined above. As an example, an EF score for an individual's asset can be calculated on a predetermined interval of measurement as:

$$2.5\mu_{EF} * \alpha_m$$

where $\alpha_m$=the number of days in a given month, $\mu_{EF}$=the average EF (energy factor) of the asset class, and the coefficient 2.5 is the household usage multiple for the specific asset being valued. One may then assume that this household uses 2.5 times the average energy factor per day, multiplied by the total days of the month for any given observed month, creating a monthly usage score that would increase the rate of depreciation expected for the asset over the given interval of time. This could dynamically change from month to month (or any other designated interval).

Certain examples according to the present disclosure provide applications which leverage the calculated rate of usage as outlined above (again note, these are merely illustrative and are not the actual usage rate calculations) and store that value on a pre-defined interval (in this example, a monthly interval), and use that score to either accelerate or decelerate the projected depreciation timeframe of the asset in that class.

For example, a household whose usage approaches the mean value may have a standard asset depreciation life of 12 years. In the case of a household which uses, on average, 2.5 times the mean, we may weight their usage pattern in such a way that the predicted depreciable life of the asset is closer to 9 years.

In this above-discussed experimental example, higher usage is not measured at a 1:1 ratio against the mean depreciation curve but instead accelerates the depreciation timeline by an average of 3 years, as other factors in addition to average household usage are part of the standard depreciation schedule.

According to certain further specific embodiments, aspects of the present disclosure are directed to projections of valuation based on received usage indications that have weighted (appreciation/depreciation) scores for an asset, for predicting a different lifespan of the asset and in some examples, subsequently creating a real-time savings strategy (and/or related financial planning strategy such as credit provisioning, lending, etc.) that assists the household in incrementally saving to replace or repair the asset in a more accurate period as predicted by the model.

As non-limiting examples, the Specification describes and/or illustrates aspects useful for implementing the claimed disclosure by way of various circuits or circuitry which may be illustrated as or using terms such as blocks, engines, modules, device, system, unit, controller, etc. and/or using other circuit-type depictions such as identified similar reference numerals as used in FIGS. 1A and 1B. Such circuits or circuitries are used together with other elements to exemplify one of many ways for how certain example embodiments may be implemented in the form or structures, steps, functions, operations, activities, etc. For example, in certain of the above-discussed embodiments, one or more modules such as depicted in FIG. 1A and other figures may be discrete logic circuits or programmable logic circuits (e.g., computer processing circuits having certain programmed portions) configured and arranged for implementing these operations/activities, as may be carried out in the approaches as discussed in connection with the above system and/or figures. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with more-detailed specific embodiments such as discussed in numerous instances above and used by the (programmable) logic circuit to perform and/or adjust the related sets of steps, actions, functions, operations, etc. Depending on the application, the instructions (and/or configuration data from the configuration controller of FIG. 1) can be configured for implementation in the logic circuitry 110 or in other logic circuitry, with the instructions (whether characterized in the form of object code, firmware or software) stored in and accessible from a memory (circuit). As another example, where the Specification may make reference to a "first [device or circuit]", a "second [device or circuit]", etc., where the [device or circuit] might be referring to one and the same thing and where in the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the facility 101 of FIG. 1 may represent at least one residence, office area, building, or an industrial area. Such modifications do not depart from the true spirit and scope of various aspects of the disclosure, including aspects set forth in the claims.

What is claimed is:
1. A system comprising:
a plurality of appliances physically distributed in a residence, each appliance comprising a sensor configured to continuously generate ongoing use signals indicative of an operational state of an appliance and a wireless transmitter configured to transmit the ongoing use signals within a local network;
at least one facility proximal device connected to the local network, the at least one facility proximal device comprising a network transmitter, the at least one facility proximal device being configured to autonomously receive the ongoing use signals from each sensor of the plurality of appliances and transmit the ongoing use signals or data indicative of the ongoing use signals over a network; and
at least one logic circuit connected to the at least one facility proximal device via the network, the at least one logic circuit configured to:
receive, via the network from the at least one facility proximal device, the ongoing use signals or data indicative of the ongoing use signals;

aggregate the ongoing use signals or data indicative of the ongoing use signals over time for each of the plurality of appliances as aggregated ongoing use data for each of the plurality of appliances, including a first appliance;

select, using a machine learning selection algorithm, one or more machine learning prediction algorithms from among a plurality of machine learning prediction algorithms based on at least one profile associated with the first appliance and the aggregated ongoing use data for the first appliance;

retrieve the one or more machine learning prediction algorithms from a memory associated with the at least one logic circuit;

input the aggregated ongoing use data for the first appliance to the one or more machine learning prediction algorithms;

execute the one or more machine learning prediction algorithms to predict, via the one or more machine learning prediction algorithms acting on the aggregated ongoing use data and third-party data for one or more variable parameters associated with the first appliance, an updated actual lifespan of the first appliance, wherein at least a portion of the third-party data is received via an application program interface (API) and based on a status change associated with the first appliance, and wherein the one or more machine learning prediction algorithms is modified based at least in part on the third-party data;

provide, via one or more user interfaces using at least one channel, a user with the updated actual lifespan;

transmit a signal to the first appliance configured to cause the first appliance to activate one or more externally detectable features associated with the first appliance;

receive, via the one or more user interfaces using the at least one channel, user input verifying activation of the one or more externally detectable features;

autonomously authenticate the user based on the user input; and autonomously trigger a schedule comprising a maintenance or repair schedule for the first appliance based on the status change associated with the first appliance in response to authenticating the user.

2. The system of claim 1, wherein acting on the aggregated ongoing use data comprises predicting, by the one or more machine learning prediction algorithms, updated lifecycle information associated with the first appliance based on the aggregated ongoing use data for the first appliance, wherein the updated actual lifespan for the first appliance comprises the updated lifecycle information, and wherein the updated lifecycle information includes at least a first score associated with a first component of the first appliance and a second score associated with a second component of the first appliance.

3. The system of claim 1,
wherein the plurality of appliances comprise one or more of solar panels, battery-assisted vehicles, plumbing appliances, or heating ventilation and air conditioning appliances.

4. The system of claim 1,
wherein the one or more machine learning prediction algorithms are configured to generate data to predict impact, based on the updated actual lifespan and further received ongoing use indications, concerning a lifecycle of the first appliance and/or an eco-related factor.

5. The system of claim 1, further including:
a data-communications server operable on behalf of a service provider and configured to provide monitoring and reporting services to a recipient associated with the plurality of appliances;
wherein the at least one logic circuit is configured to predict the updated actual lifespan via the one or more machine learning prediction algorithms further acting on past aggregated ongoing use data for a second plurality of appliances belonging to same asset class as the first appliance.

6. The system of claim 1,
wherein inputting the aggregated ongoing use data for the first appliance to the one or more machine learning prediction algorithms comprises inputting behavioral feedback based on the aggregated ongoing use data to the one or more machine learning prediction algorithms.

7. The system of claim 1,
wherein the at least one logic circuit is further configured to transmit data regarding use of the first appliance via a communications device to a server.

8. The system of claim 1,
wherein the one or more variable parameters comprise one or more of (a) a technology category, (b) an aesthetic score that varies as a function of one or both of time and the ongoing use signals for the first appliance, or (c) an aging score that varies as a function of one or both of time and the ongoing use signals for the first appliance.

9. The system of claim 1, wherein acting on the aggregated ongoing use data for the first appliance to predict the updated actual lifespan comprises predicting by the one or more machine learning prediction algorithms updated lifecycle information for the first appliance based on an aging score scale associated with a technology category linked to the first appliance and a variable score which varies as a function of one or both of time and the ongoing use signals for the first appliance.

10. The system of claim 1,
wherein the plurality of appliances include at least two appliances selected from a group consisting of: (i) an automobile, (ii) an Internet of Things device, (iii) a personal device configured to require login credentials, (iv) a device that tracks energy, and (v) a device that generates energy.

11. The system of claim 1,
wherein the one or more machine learning prediction algorithms are configured to receive behavior data associated with the first appliance,
wherein, the at least one logic circuit is further configured to update, via the one or more machine learning prediction algorithms acting on the behavior data updated lifecycle information associated with the first appliance based on:
a. reported observations concerning one or more of the plurality of appliances over a span of time associated with use of the first appliance;
b. ongoing use signals for the first appliance; and
c. adjustments to the one or more variable parameters used by the one or more machine learning prediction algorithms.

12. The system of claim 1, wherein the at least one logic circuit is further configured to:
modify, via one or more artificial intelligence algorithms, updated lifecycle information associated with the first appliance.

13. The system of claim 1, wherein the at least one logic circuit is further configured to:
- generate one or more updated machine learning prediction algorithms based on the one or more machine learning prediction algorithms and the updated actual lifespan;
- receive second aggregated ongoing use data associated with a replacement appliance for the first appliance;
- predict, via the one or more updated machine learning prediction algorithms acting on the second aggregated ongoing use data, a second updated actual lifespan of the replacement appliance; and
- transmit instructions configured to cause replacement of the replacement appliance based on the second updated actual lifespan.

14. The system of claim 1, wherein the one or more machine learning prediction algorithms are trained based on data from appliance types corresponding to the first appliance, wherein the at least one logic circuit is further configured to:
- update the one or more machine learning prediction algorithms by learning based on the updated actual lifespan for the first appliance.

* * * * *